(12) United States Patent
Benninger et al.

(10) Patent No.: US 11,841,112 B2
(45) Date of Patent: Dec. 12, 2023

(54) STORAGE VESSELS WITH FIBER COMPOSITE REINFORCEMENT

(71) Applicant: LOCKHEED MARTIN CORPORATION, Bethesda, MD (US)

(72) Inventors: Lawrence Francis Benninger, Littleton, CO (US); Mohammad Saiful Islam, Sydney (AU); Chun Hui Wang, Sydney (AU); Joseph Peter Calibeo, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 17/701,318

(22) Filed: Mar. 22, 2022

(65) Prior Publication Data
US 2022/0307649 A1    Sep. 29, 2022

Related U.S. Application Data

(60) Provisional application No. 63/165,584, filed on Mar. 24, 2021.

(51) Int. Cl.
*B29C 63/00* (2006.01)
*B29C 63/06* (2006.01)
(Continued)

(52) U.S. Cl.
CPC ............ *F17C 1/16* (2013.01); *B29C 63/0017* (2013.01); *B29C 63/06* (2013.01); *B32B 1/00* (2013.01); *B32B 27/38* (2013.01); *C08K 3/22* (2013.01); *C08K 9/08* (2013.01); *B29K 2105/251* (2013.01); *B29K 2307/04* (2013.01); *B29K 2509/02* (2013.01); *B29L 2031/7156* (2013.01); *B32B 2262/106* (2013.01); *B32B 2264/102* (2013.01); *B32B 2264/301* (2020.08); *B32B 2264/403* (2020.08); *B32B 2439/40* (2013.01);
(Continued)

(58) Field of Classification Search
CPC .......... F17C 2221/011; F17C 2221/012; F17C 2221/014; F17C 1/02; F17C 1/04; F17C 1/06; F17C 1/16; B32B 27/38
USPC ............. 428/34.1–36.92; 220/560.04–560.15
See application file for complete search history.

(56) References Cited

U.S. PATENT DOCUMENTS 5,304,435 A * 4/1994 Jones .................. H01M 10/613
429/120
8,517,206 B2    8/2013 Liu
(Continued)

FOREIGN PATENT DOCUMENTS

CN    112361204    * 2/2021 ............... F17C 1/12

*Primary Examiner* — Michael C Romanowski
(74) *Attorney, Agent, or Firm* — BAKERHOSTETLER

(57) ABSTRACT

A storage vessel can include a shell that is formed by fibers wound about an axis and infused with a resin matrix. The resin matrix can include metal nanoparticles coated with a polymer and distributed within a resin. The nanoparticles provide low coefficients of thermal expansion, and the polymer coatings enhance their bonding with the resin. The shells of such storage vessels provide increased tensile strength and modulus at both room and cryogenic temperatures. Such improvements stem from the higher interfacial residual thermal stress at cryogenic temperature due to their low thermal expansion properties, which in turn promotes crack branching that increases the energy dissipation of the matrix.

12 Claims, 34 Drawing Sheets

(51) Int. Cl.
*F17C 1/16* (2006.01)
*C08K 3/22* (2006.01)
*C08K 9/08* (2006.01)
*B32B 27/38* (2006.01)
*B32B 1/00* (2006.01)
*B29L 31/00* (2006.01)
*B29K 105/00* (2006.01)
*B29K 307/04* (2006.01)
*B29K 509/02* (2006.01)

(52) U.S. Cl.
CPC ............... *C08K 2003/2248* (2013.01); *F17C 2201/0109* (2013.01); *F17C 2203/0604* (2013.01); *F17C 2203/0617* (2013.01); *F17C 2203/0673* (2013.01); *F17C 2209/2154* (2013.01)

(56) References Cited

U.S. PATENT DOCUMENTS

| | | | | |
|---|---|---|---|---|
| 9,234,625 | B2 | 1/2016 | Sirosh | |
| 2004/0149759 | A1* | 8/2004 | Moser | F17C 1/10 220/581 |
| 2004/0206762 | A1* | 10/2004 | Iida | F17C 1/06 220/581 |
| 2006/0068993 | A1* | 3/2006 | Egan | F17C 3/08 505/211 |
| 2006/0099366 | A1 | 5/2006 | Takemoto et al. | |
| 2009/0314785 | A1* | 12/2009 | Cronin | B29C 53/602 156/305 |
| 2011/0017867 | A1* | 1/2011 | Simmons | B32B 5/24 428/300.1 |
| 2011/0309074 | A1* | 12/2011 | Thunhorst | F17C 1/16 220/660 |
| 2012/0237605 | A1* | 9/2012 | Messersmith | B22F 1/054 977/773 |
| 2012/0241371 | A1* | 9/2012 | Revanur | B82Y 40/00 210/488 |
| 2014/0061135 | A1* | 3/2014 | Messersmith | B01J 20/28019 210/660 |
| 2015/0057404 | A1* | 2/2015 | Ogaki | C09D 5/1637 524/498 |
| 2015/0241139 | A1* | 8/2015 | McGinnis | F28F 21/062 165/172 |
| 2016/0101390 | A1* | 4/2016 | Chen | B01D 71/022 210/500.21 |
| 2018/0056248 | A1* | 3/2018 | Guha | B01D 71/56 |
| 2018/0100047 | A1* | 4/2018 | Iftime | B05D 3/108 |
| 2021/0261837 | A1* | 8/2021 | Forster | C09J 11/04 |
| 2021/0404603 | A1 | 12/2021 | Sirosh | |
| 2022/0003362 | A1* | 1/2022 | Forster | F16L 9/147 |
| 2023/0173423 | A1* | 6/2023 | Yuksel Imer | B01D 39/20 96/225 |

* cited by examiner

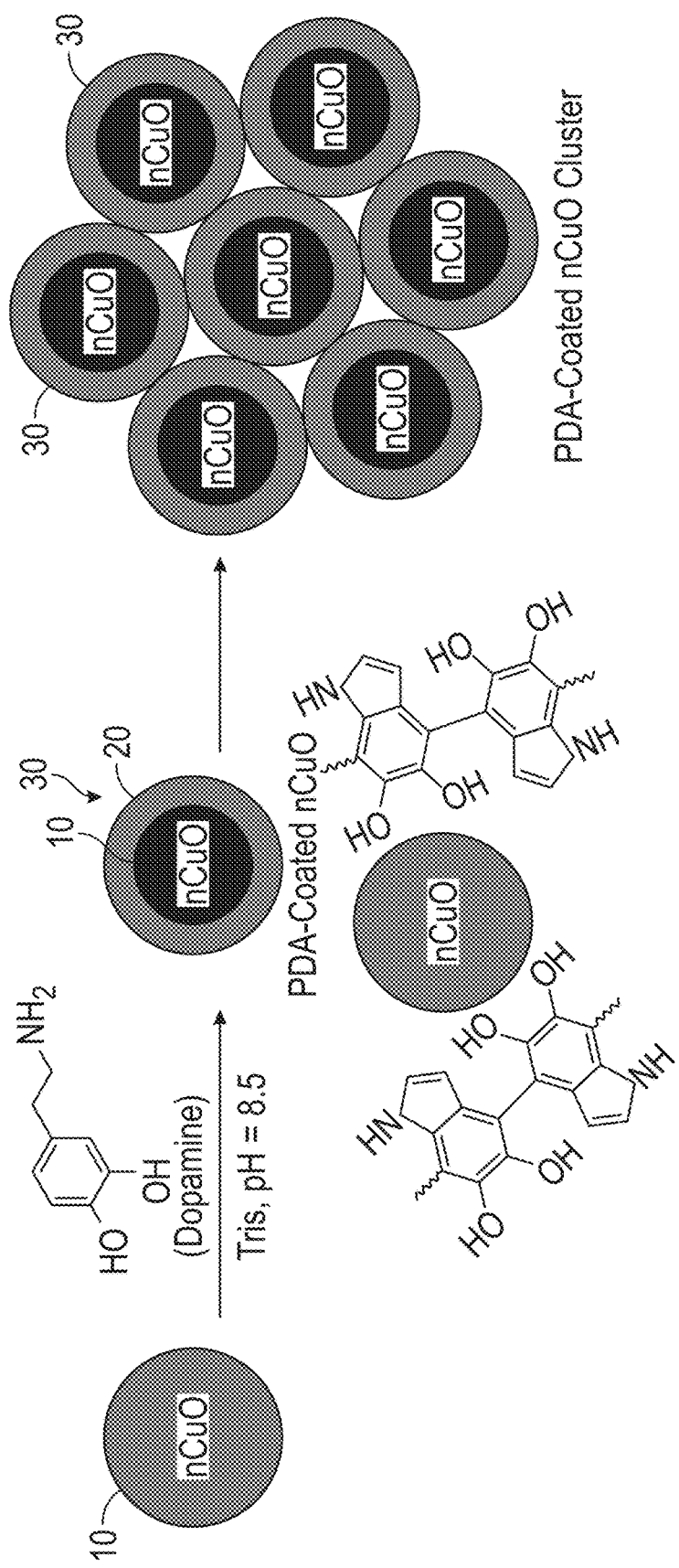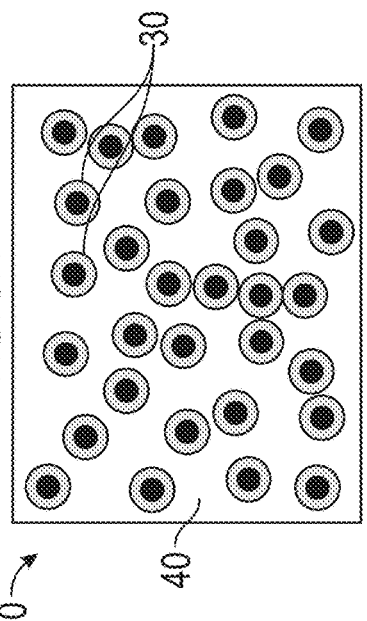
FIG. 3A
FIG. 3B

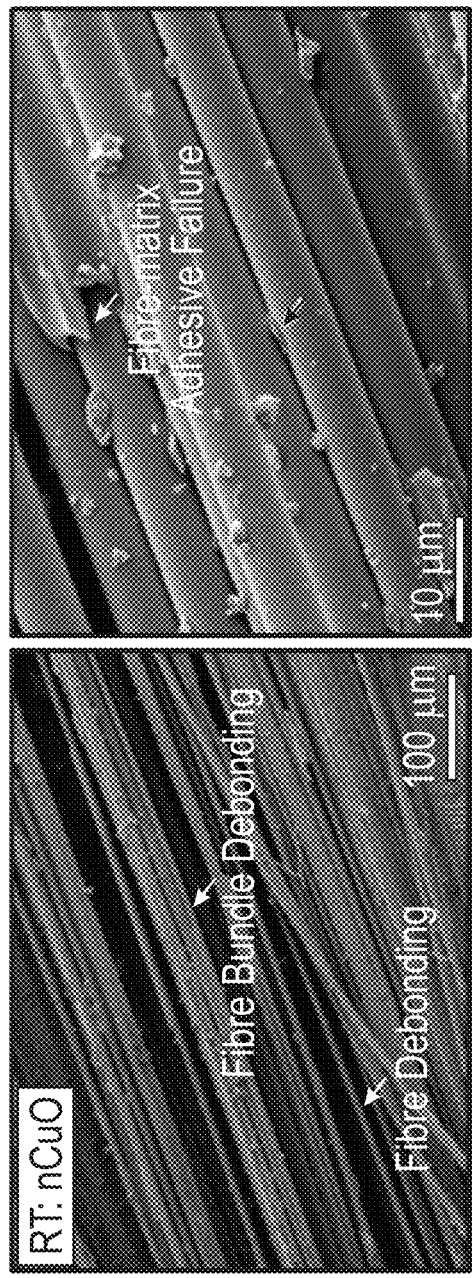
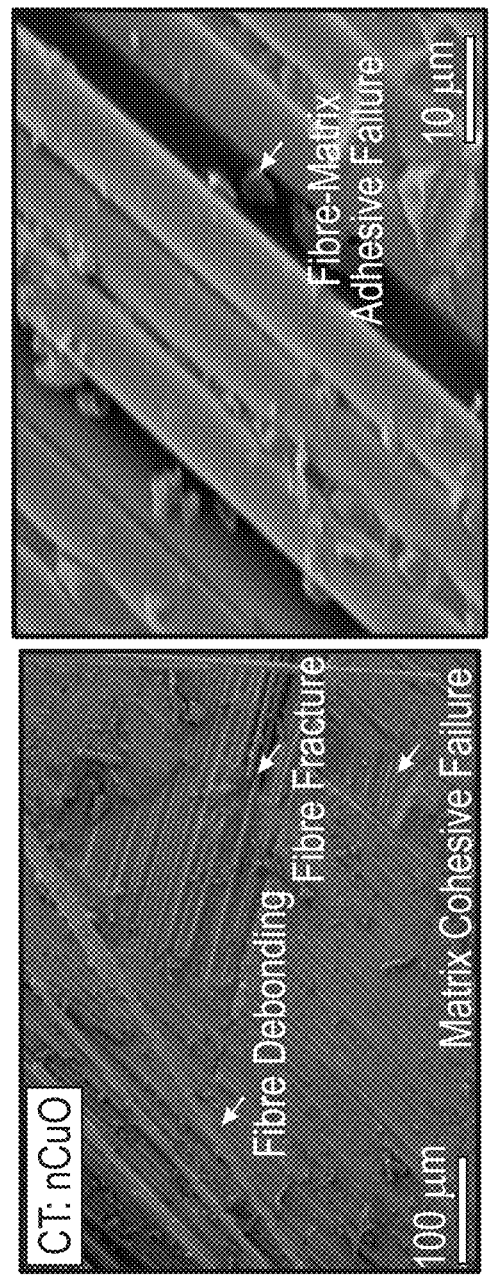
FIG. 13A
FIG. 13B

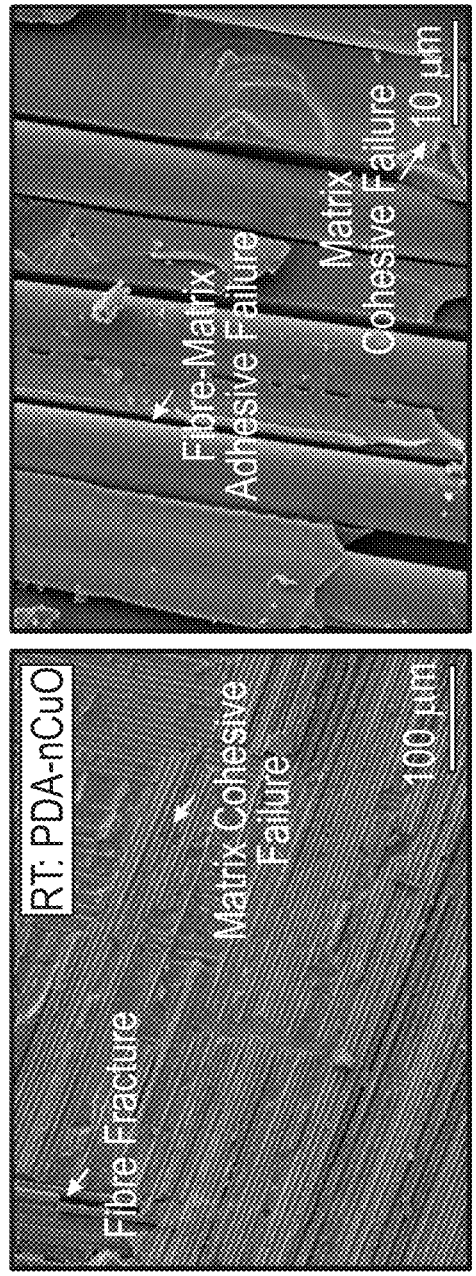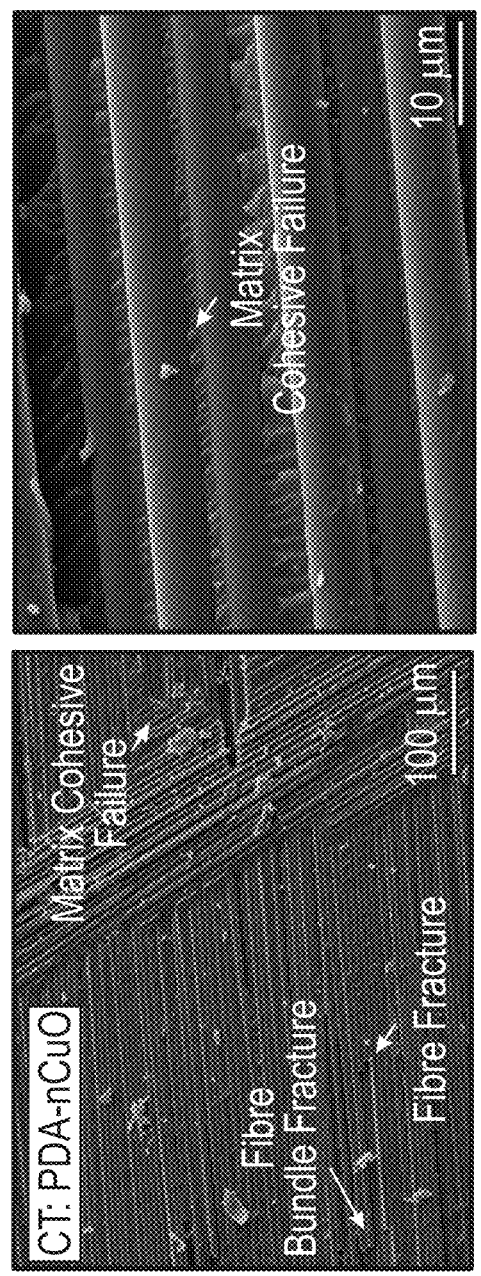
FIG. 13C
FIG. 13D

STORAGE VESSELS WITH FIBER COMPOSITE REINFORCEMENT

CROSS-REFERENCE TO RELATED APPLICATION

This application claims the benefit of U.S. Provisional Application No. 63/165,584, entitled "STORAGE VESSELS WITH FIBER COMPOSITE REINFORCEMENT," filed Mar. 24, 2021, the entirety of which is incorporated herein by reference.

STATEMENT REGARDING FEDERALLY SPONSORED RESEARCH OR DEVELOPMENT

Not applicable.

TECHNICAL FIELD

The present description relates in general to storage vessels, and more particularly to, for example, without limitation, carbon fiber composites for storage vessels.

BACKGROUND OF THE DISCLOSURE

Matrix cracking of carbon fiber reinforced polymer composites at super cold temperatures, such as liquid hydrogen temperature, introduces microcracks induced by the high thermal residual stresses in the matrix which can cause fuel leaks and degrade the structural integrity of a storage vessel.

The description provided in the background section should not be assumed to be prior art merely because it is mentioned in or associated with the background section. The background section may include information that describes one or more aspects of the subject technology.

BRIEF DESCRIPTION OF THE DRAWINGS

FIG. 3A illustrates a procedure for the PDA coating of CuO nanoparticles.

FIG. 3B illustrates the PDA-coated CuO dispersed in PDA-coated CuO-epoxy nanocomposites.

FIG. 13A illustrates SEM micrographs of the fracture surface of DCB specimens of laminates modified by nCuO at RT.

FIG. 13B illustrates SEM micrographs of the fracture surface of DCB specimens of laminates modified by nCuO at CT.

FIG. 13C illustrates SEM micrographs of the fracture surface of DCB specimens of laminates modified by PDA-coated nCuO at RT.

FIG. 13D illustrates SEM micrographs of the fracture surface of DCB specimens of laminates modified by PDA-coated nCuO at CT.

Figure 15:
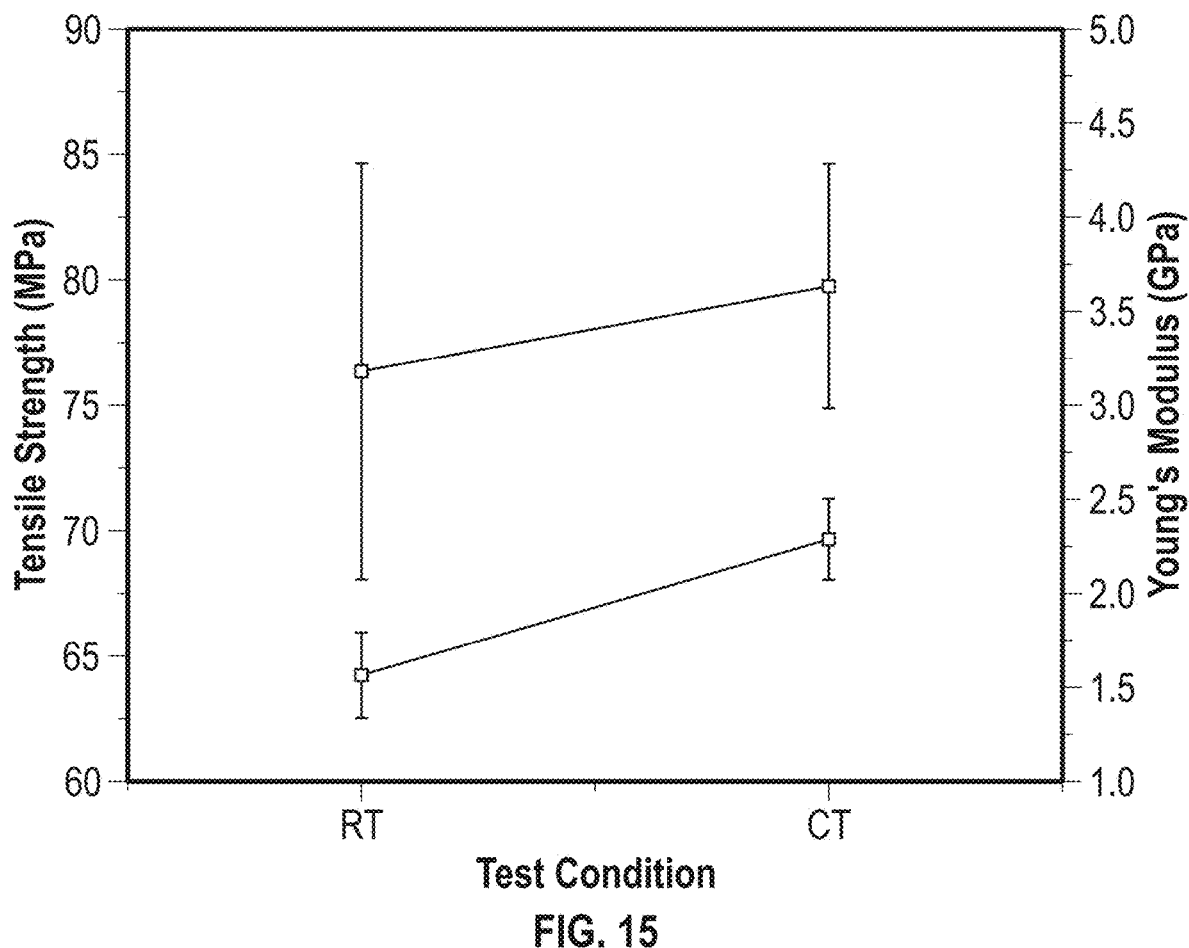

FIG. 15 illustrates tensile strength and modulus of neat epoxy at RT and CT.

Figure 16A:
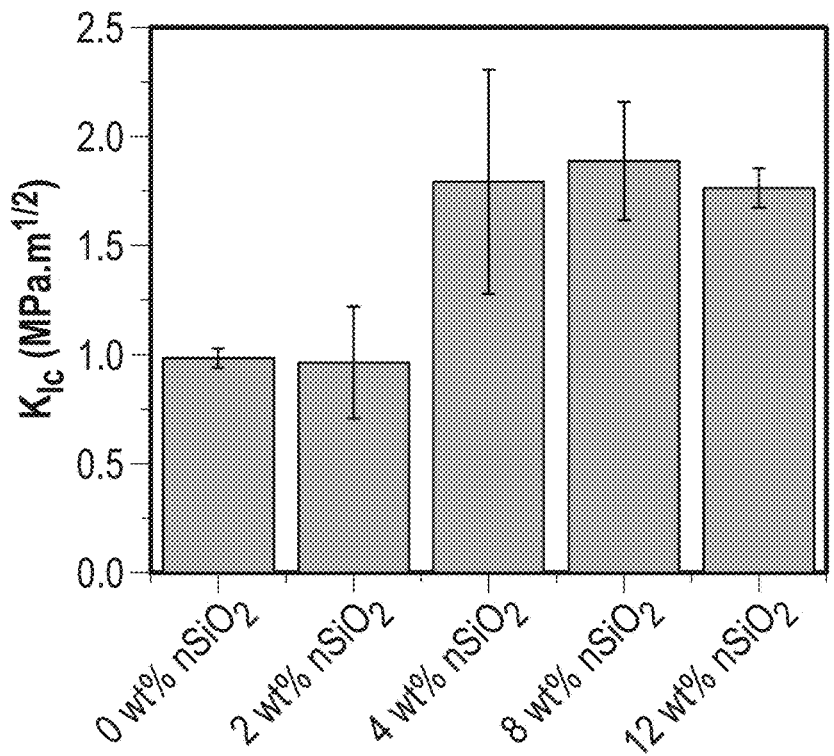

FIG. 16A illustrates fracture toughness of $nSiO_2$-epoxy nanocomposites at RT.

Figure 16B:
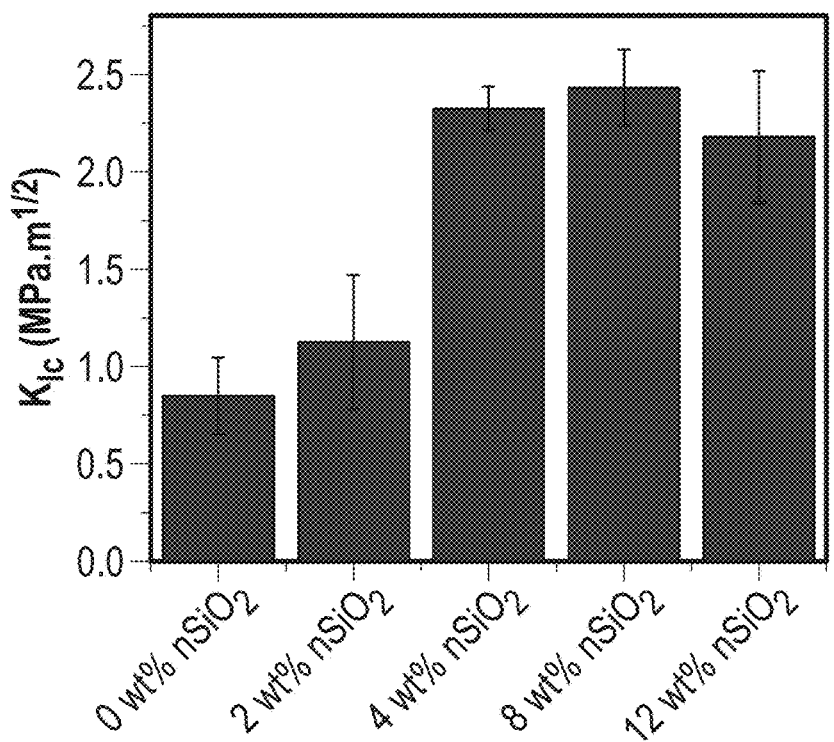

FIG. 16B illustrates fracture toughness of $nSiO_2$-epoxy nanocomposites at CT.

Figure 16C:
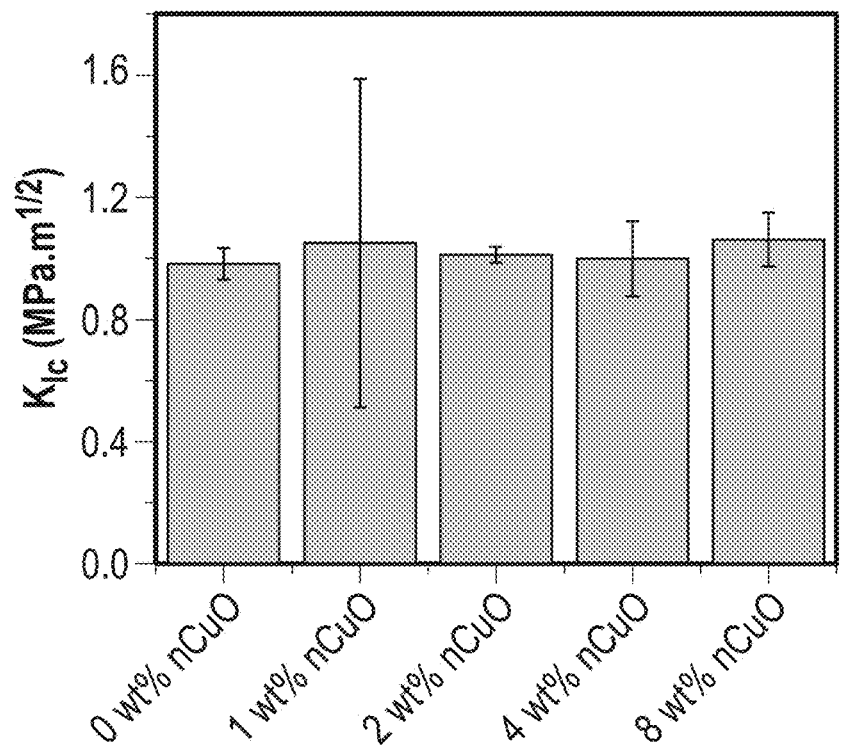

FIG. 16C illustrates fracture toughness of nCuO-epoxy nanocomposites at RT.

Figure 16D:
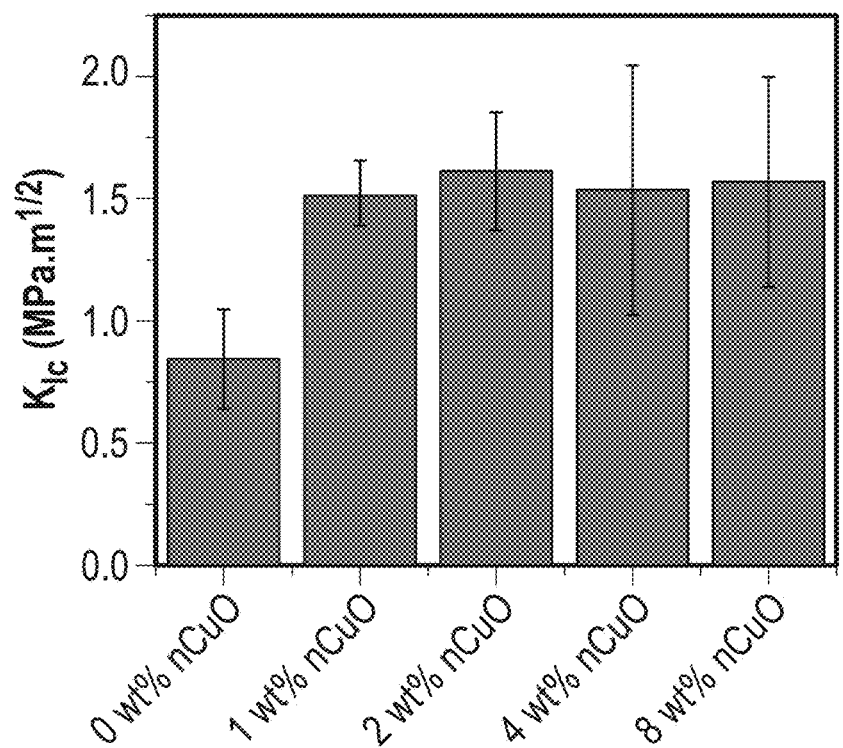

FIG. 16D illustrates fracture toughness of nCuO-epoxy nanocomposites at CT.

Figure 16E:
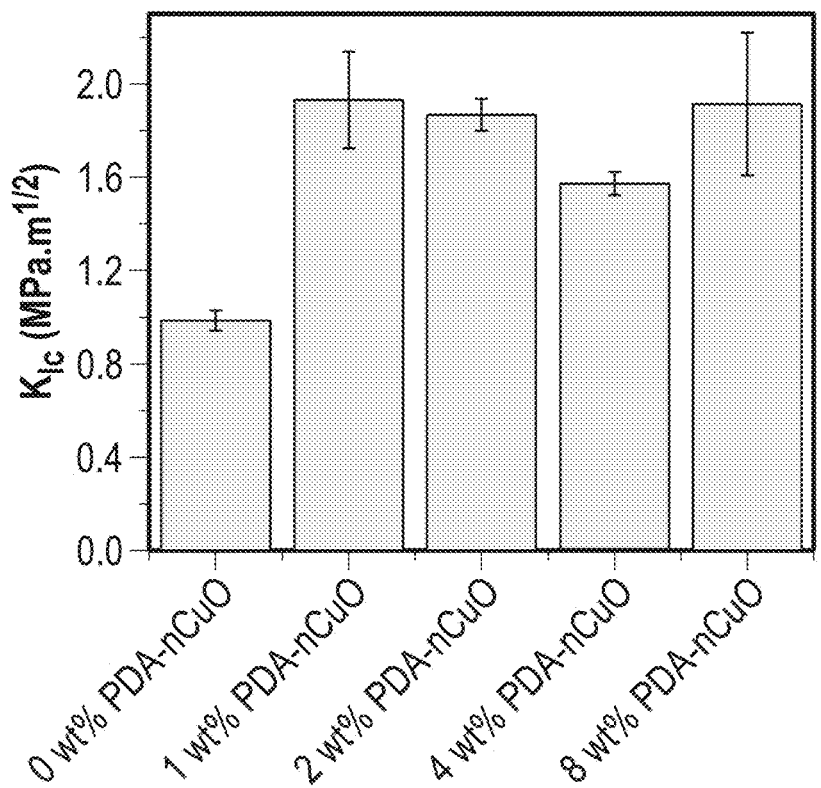

FIG. 16E illustrates fracture toughness of PDA-coated nCuO-epoxy nanocomposites at RT.

Figure 16F:
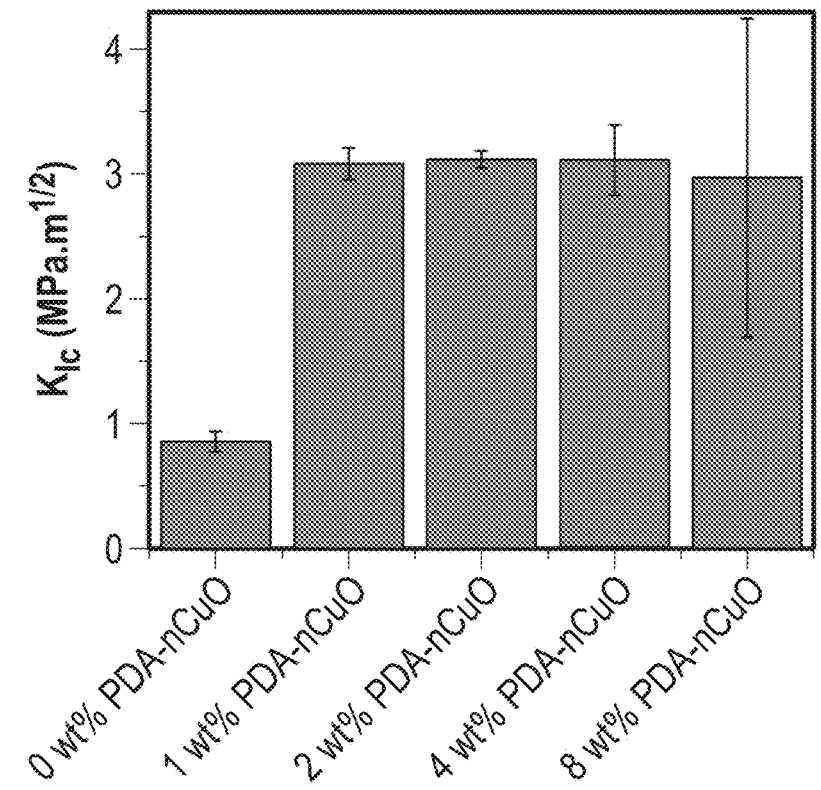
Figure 17A:
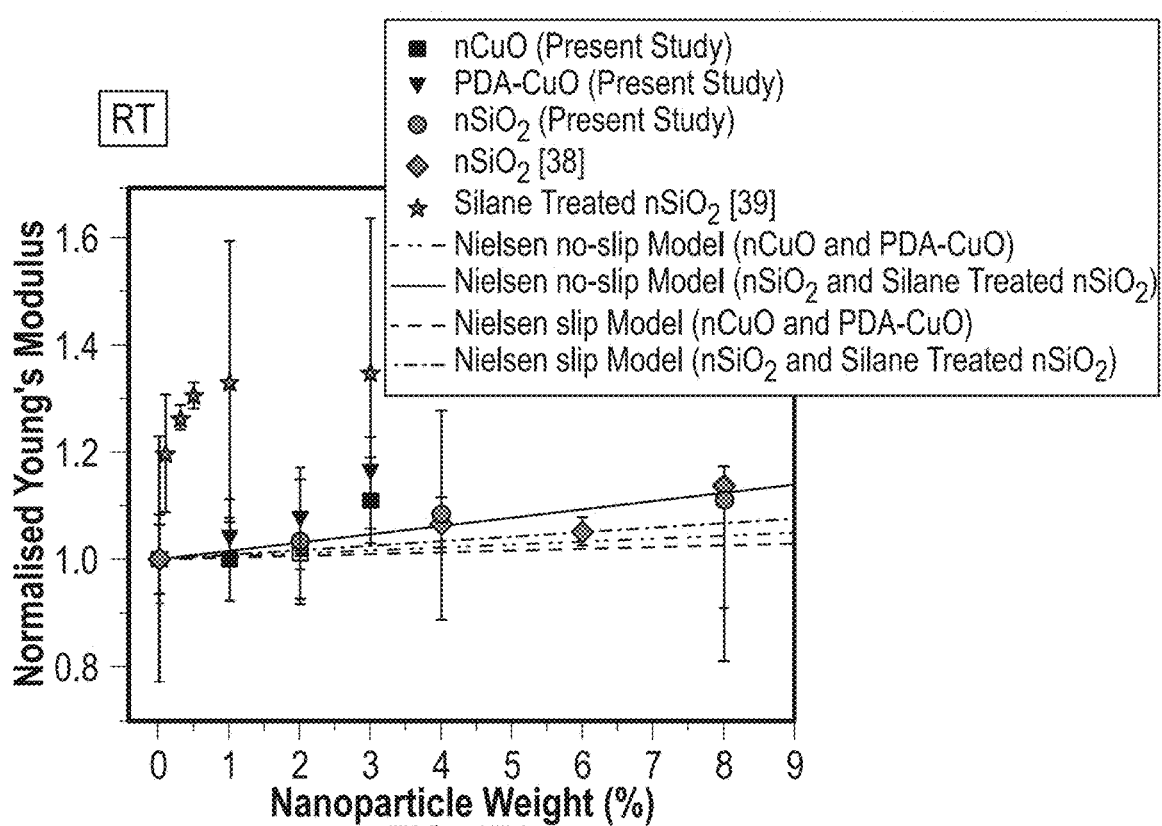
Figure 17B:
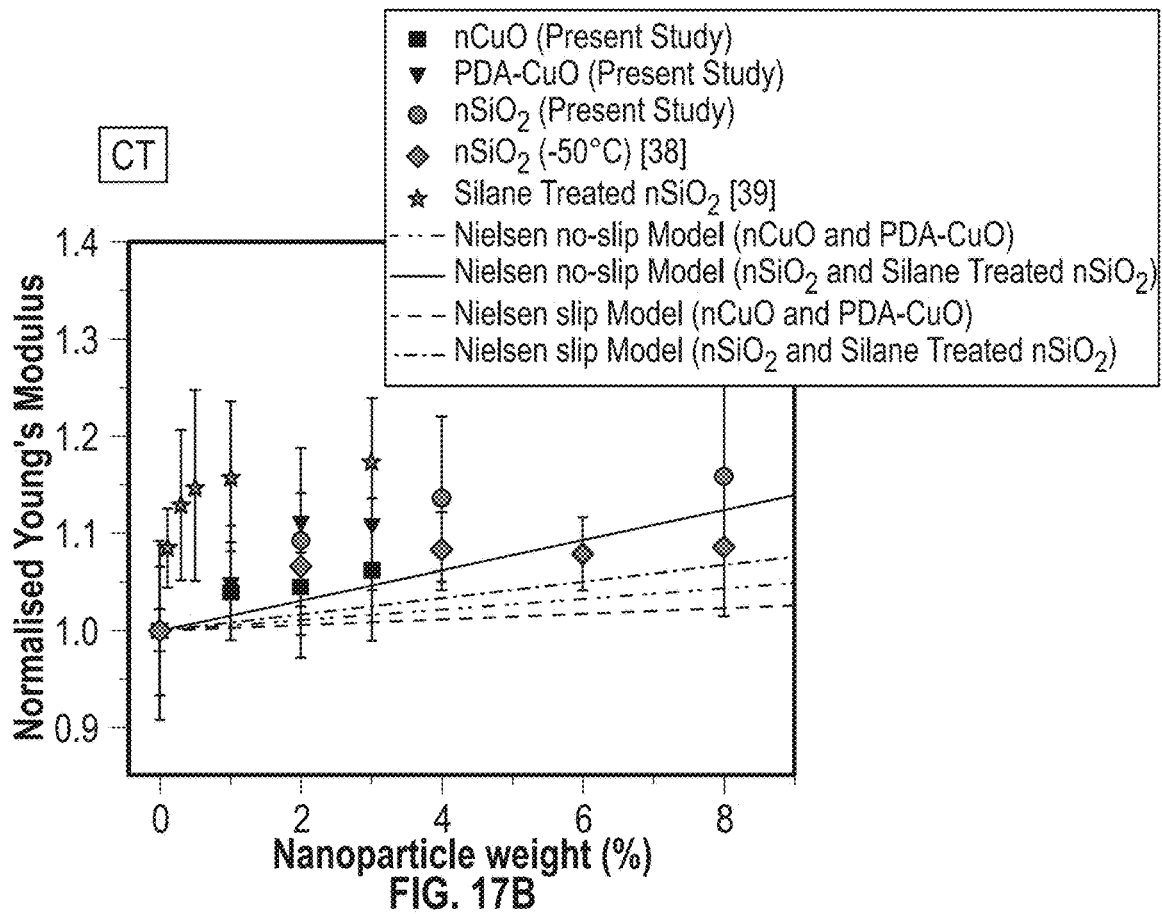
Figure 17C:
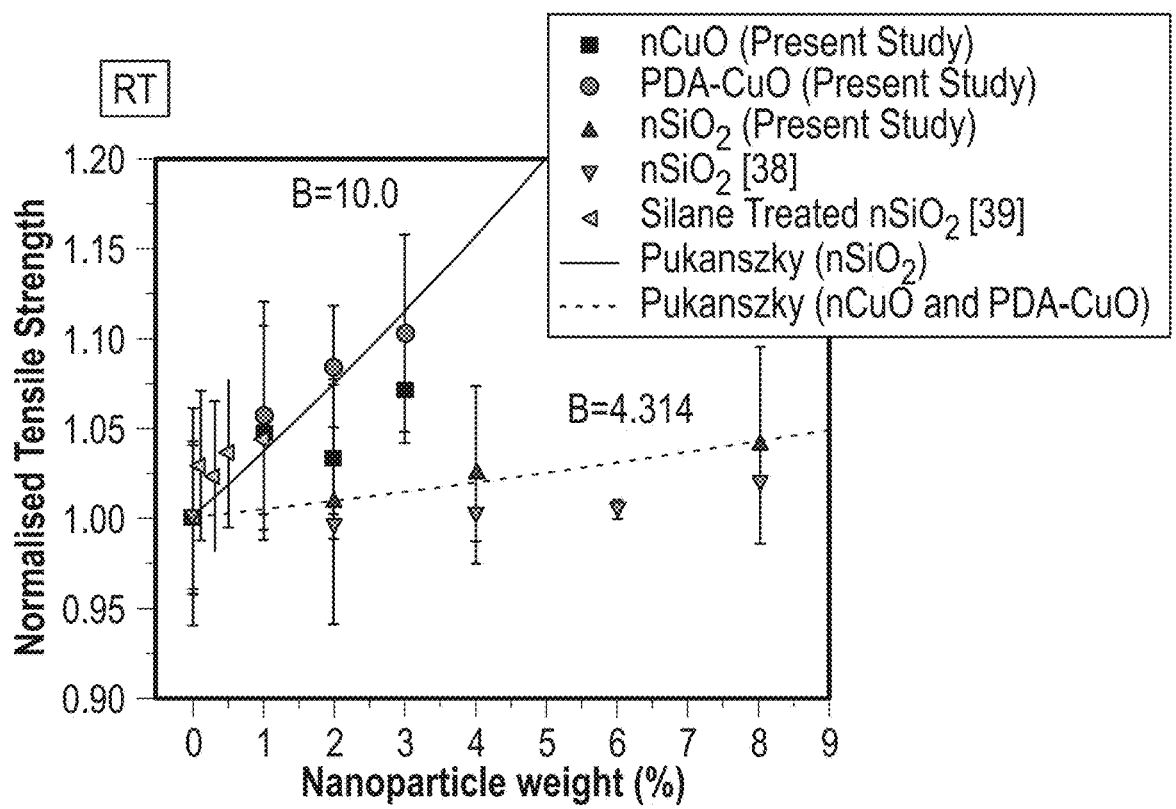
Figure 17D:
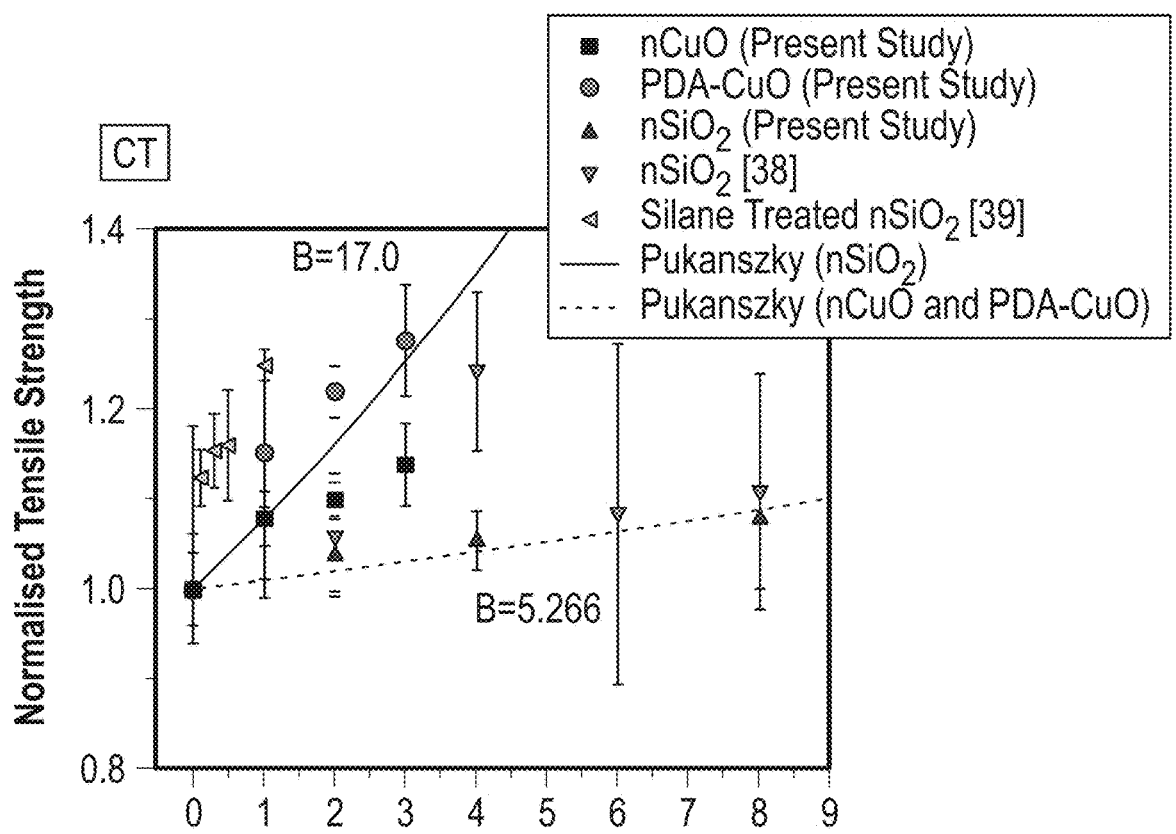

FIG. 16F illustrates fracture toughness of PDA-coated nCuO-epoxy nanocomposites at CT.

FIGS. 17A, 17B, 17C, and 17D illustrate normalized Young's modulus and tensile strength as a function of percentage weight of nanoparticles are shown both at RT and CT. In FIGS. 17A-D, error bars each corresponds to one standard deviation. Results from theoretical models (Eq. (5) for the normalised Young's modulus and Eq. (6) for the normalized tensile strength) are also provided for comparison.

Figure 18A:
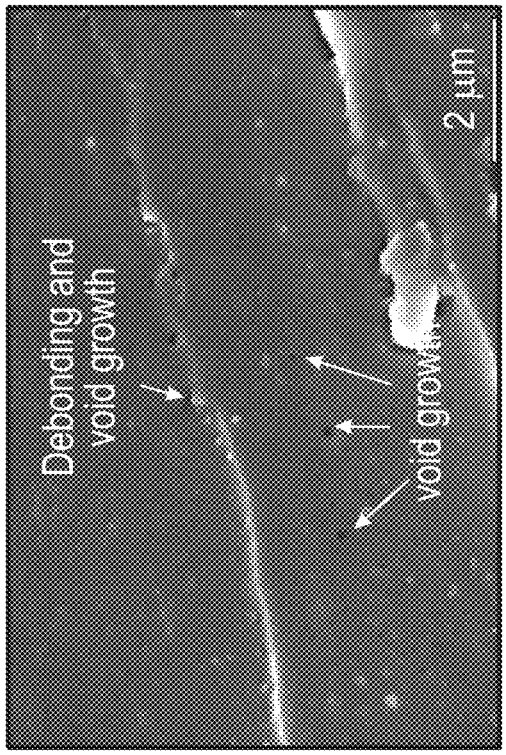
Figure 18A:
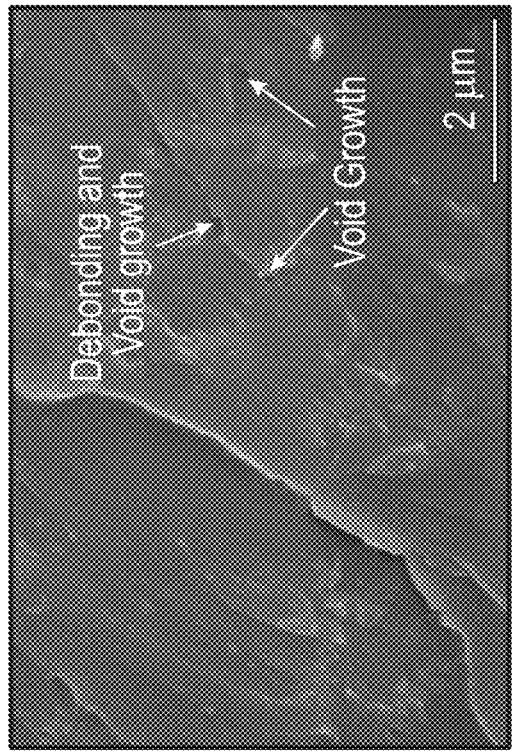

FIG. 18A illustrates SENB fracture surfaces of $nSiO_2$-epoxy nanocomposites at RT.

Figure 18B:
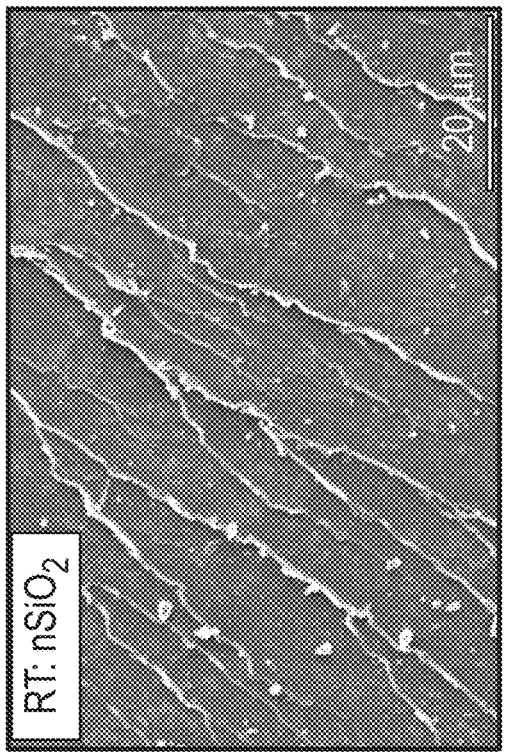
Figure 18B:
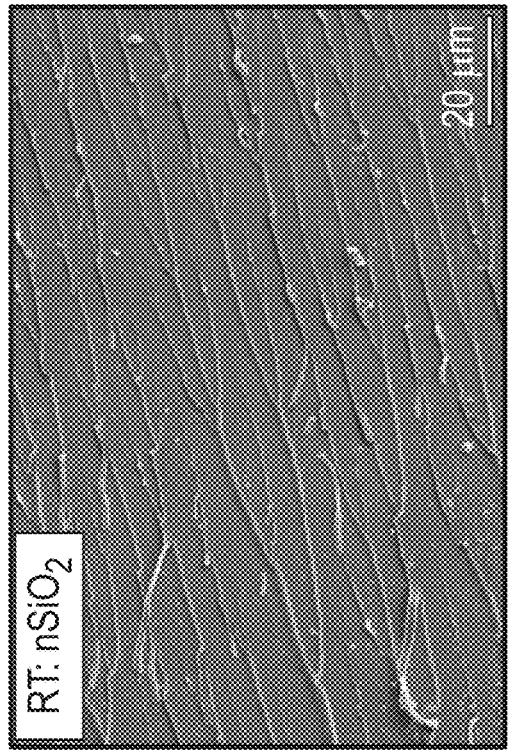

FIG. 18B illustrates SENB fracture surfaces of $nSiO_2$-epoxy nanocomposites at CT.

Figure 18C:
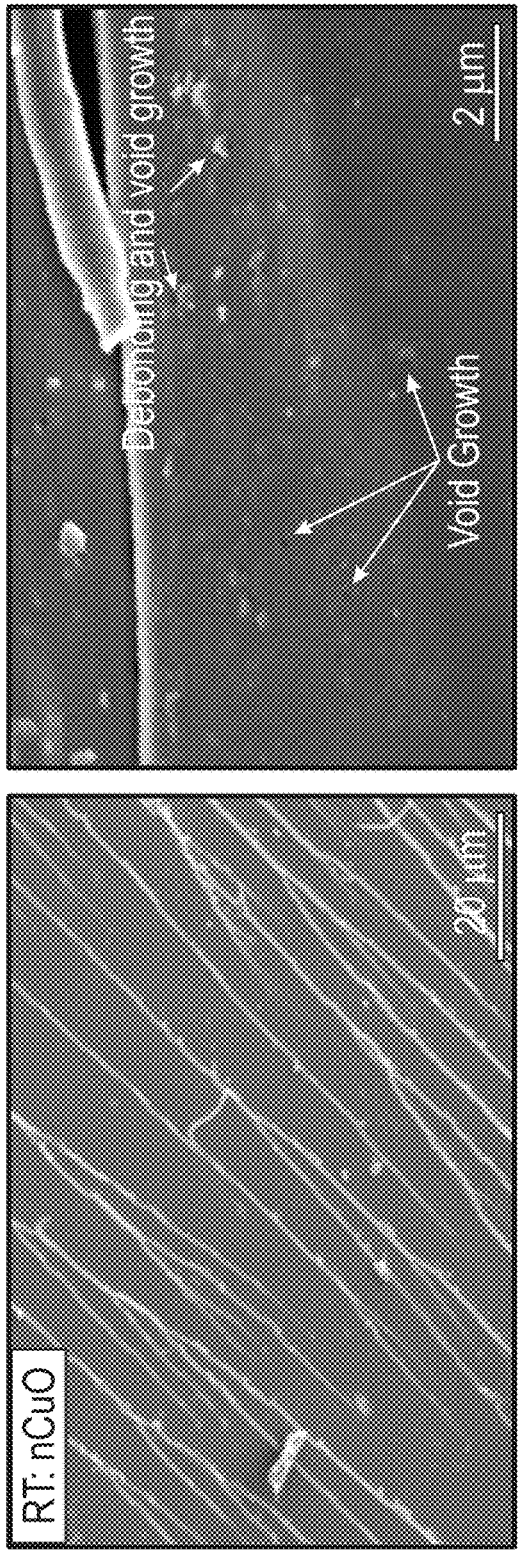

FIG. 18C illustrates SENB fracture surfaces of nCuO-epoxy nanocomposites at RT.

Figure 18D:
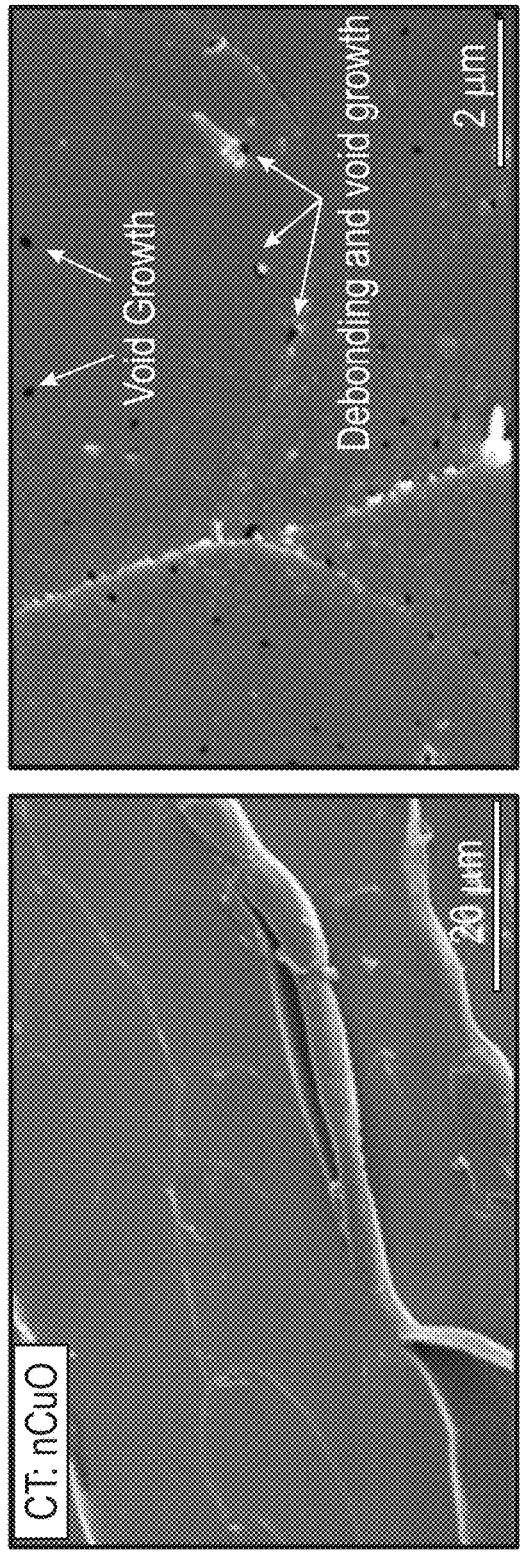

FIG. 18D illustrates SENB fracture surfaces of nCuO-epoxy nanocomposites at CT.

Figure 18E:
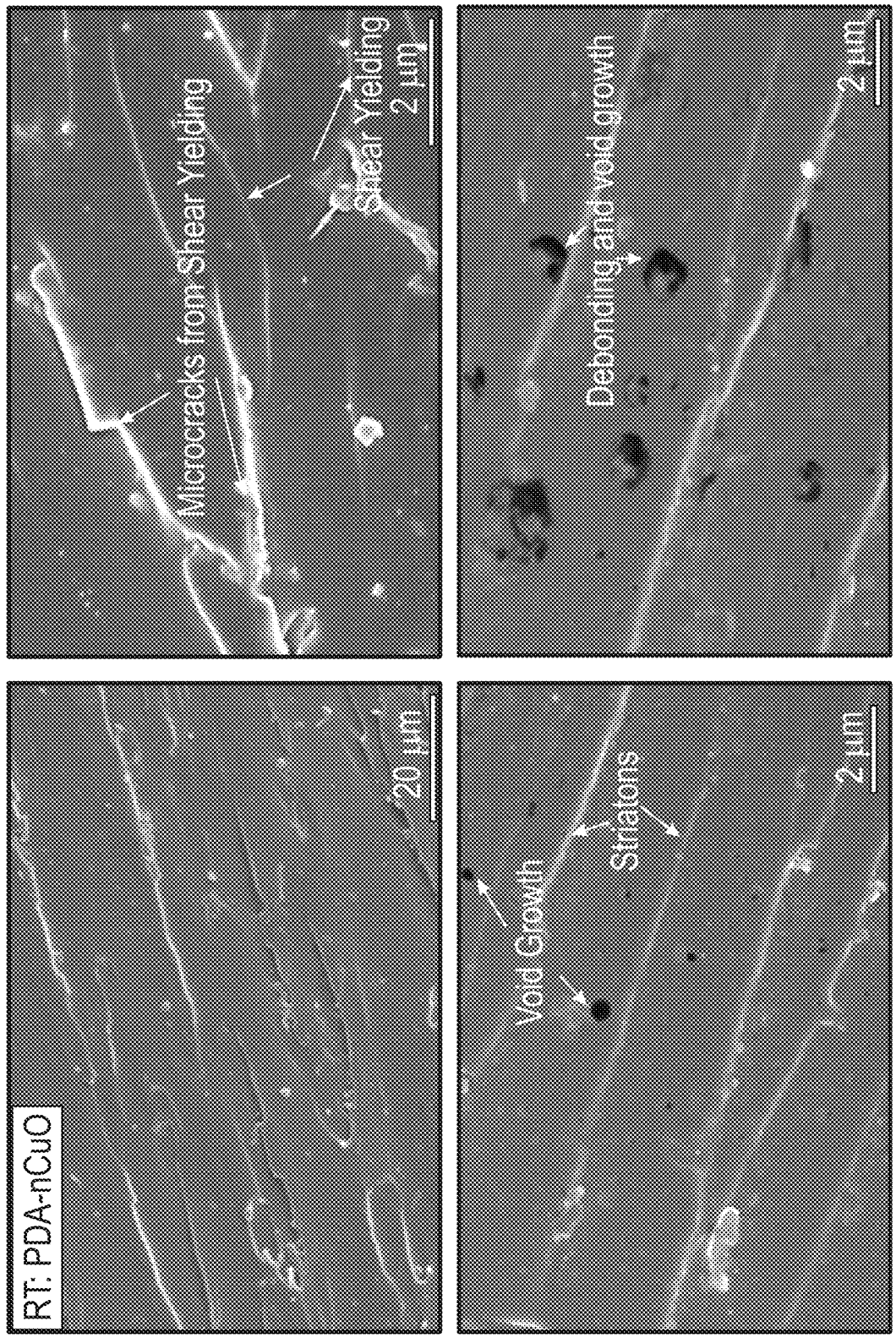

FIG. 18E illustrates SENB fracture surfaces of PDA-coated nCuO-epoxy nanocomposites at RT.

Figure 18F:
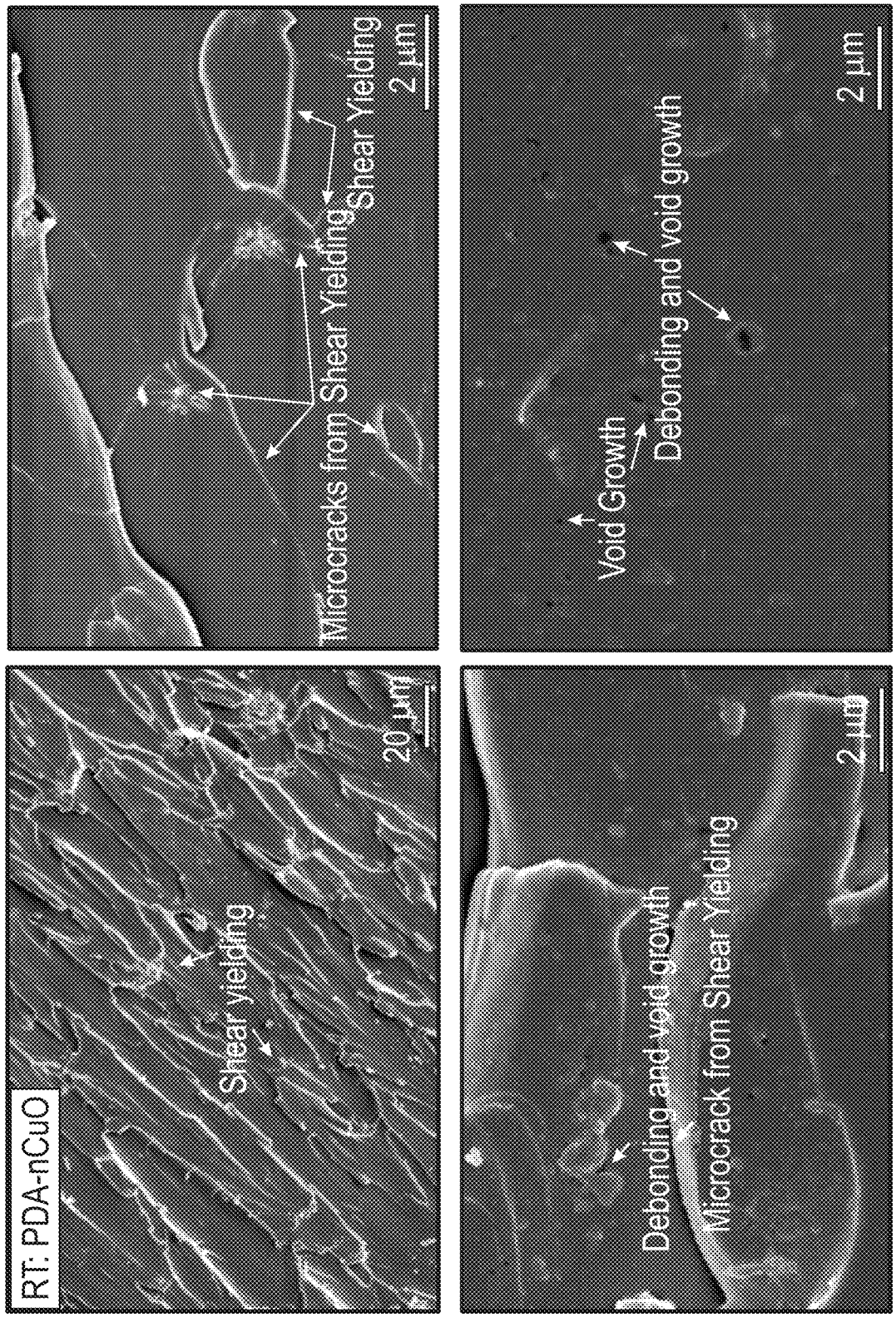

FIG. 18F illustrates SENB fracture surfaces of PDA-coated nCuO-epoxy nanocomposites at CT.

Figure 19:
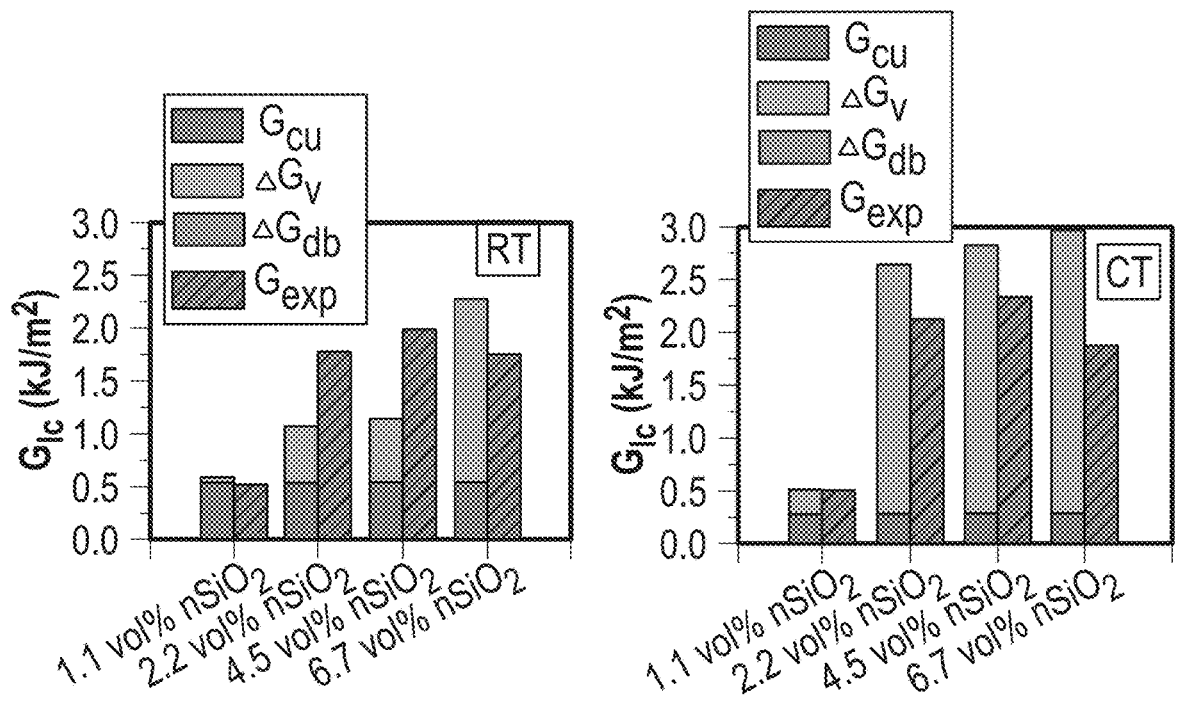

FIG. 19 illustrates contributions of different fracture mechanisms compared with the neat epoxy contribution at RT (left) and CT (right) for $nSiO_2$ versus experimental values at various volume percentages.

Figure 20:
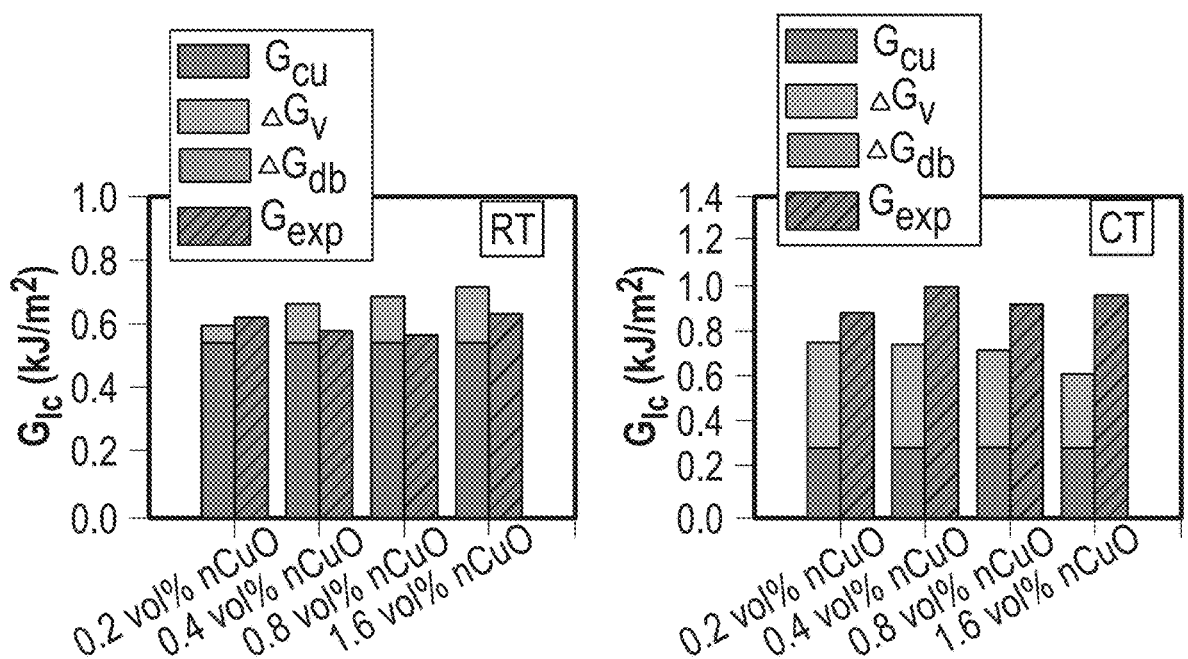

FIG. 20 illustrates contributions of different fracture mechanisms compared with the neat epoxy contribution at RT (left) and CT (right) for nCuO versus experimental values at various volume percentages.

Figure 21A:
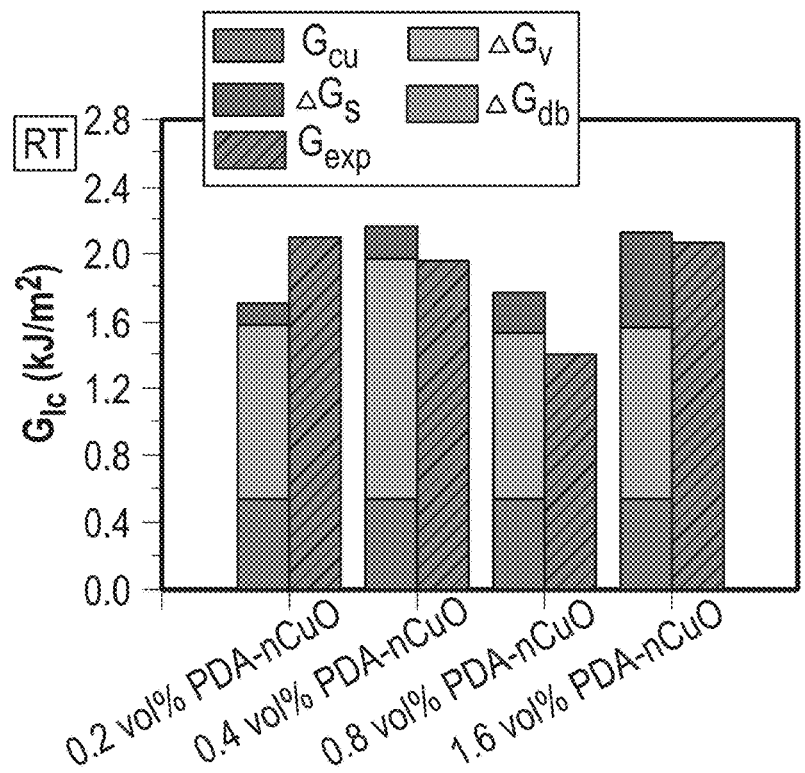

FIG. 21A illustrates contributions of different fracture mechanisms compared with the neat epoxy contribution at RT for PDA-coated nCuO versus experimental values at various volume percentages.

Figure 21B:
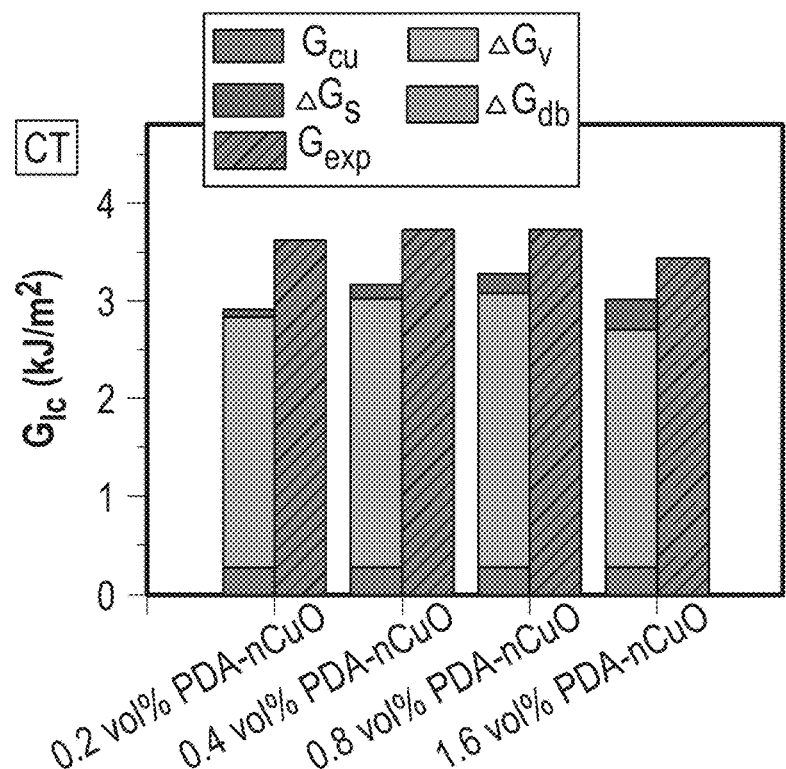

FIG. 21B illustrates contributions of different fracture mechanisms compared with the neat epoxy contribution at CT for PDA-coated nCuO versus experimental values at various volume percentages.

Figure 22A:
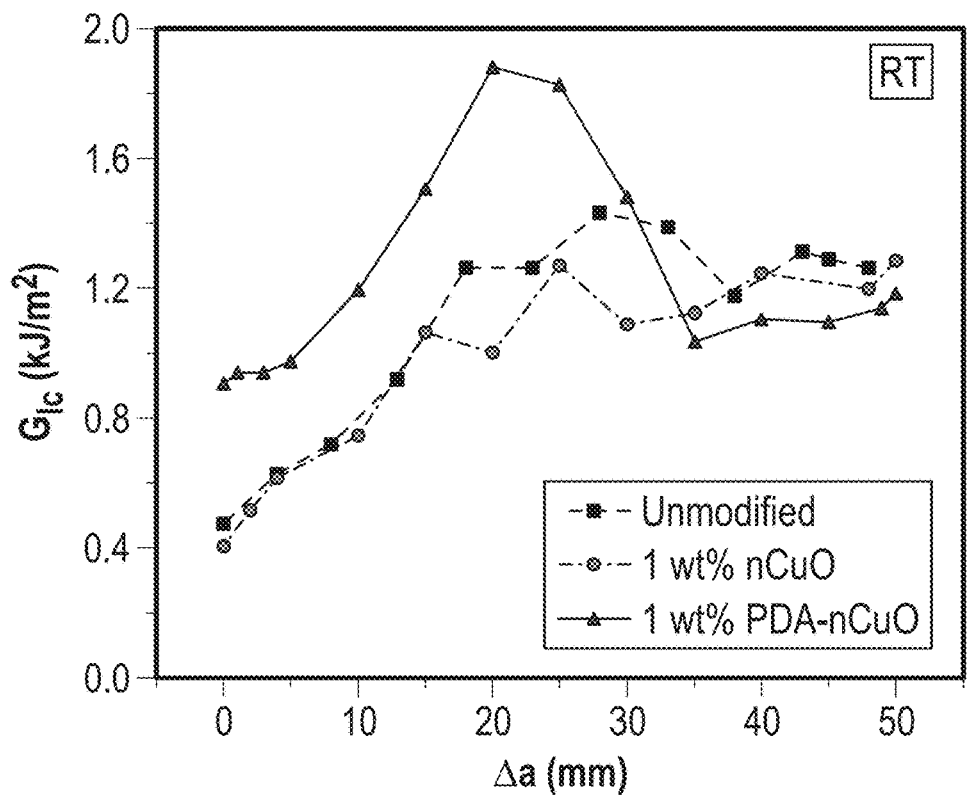

FIG. 22A illustrates R curves for ±35° angle ply unmodified, 1 wt % nCuO and 1 wt % PDA-coated nCuO-laminates at RT.

Figure 22B:
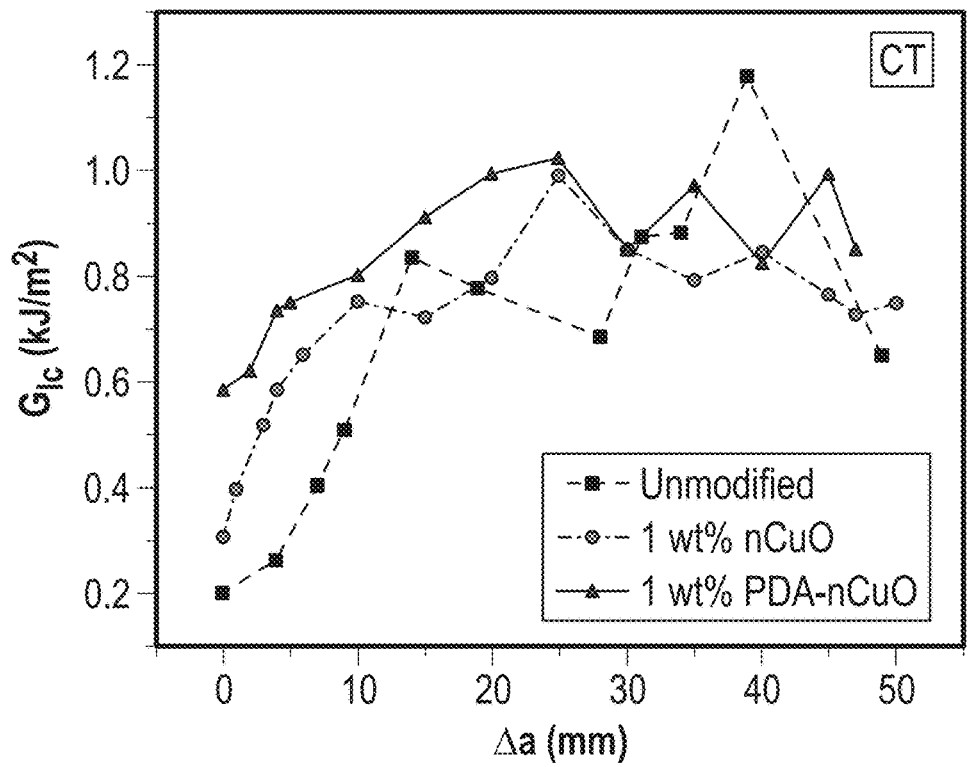

FIG. 22B illustrates R curves for ±35° angle ply unmodified, 1 wt % nCuO and 1 wt % PDA-coated nCuO-laminates at CT.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Disclosed herein is a method of toughening carbon fiber composites using nanomaterials of low-thermal expansion, i.e., nano-silica (nano-$SiO_2$) and nano-cupric oxide (nano-CuO), at cryogenic liquid nitrogen temperature (~196° C.). In addition to their low coefficients of thermal expansion, these two nanoparticles are sufficiently small to avoid the filtering effect of carbon fibers during resin infusion process. The surfaces of CuO nanoparticles are functionalized by a polydopamine coating to enhance their bonding with the epoxy resin and the cross-linking density of the epoxy resin. Results from tension and fracture toughness tests of an epoxy modified with these nanoparticles reveal that PDA-coated CuO nanoparticles are more effective than their uncoated counterpart and nano-silica in increasing the tensile strength and modulus at both room and cryogenic temperatures, with the percentage of improvements at the cryogenic temperature being even higher than at room temperature. Furthermore, PDA-coated CuO nanoparticles demonstrate significant improvements in the initiation and propagation fracture toughness of angle-ply carbon fiber composite ([±35]$_8$) by 113% and 46% respectively at cryogenic temperature. The underlying toughening mechanisms are identified using scanning electron microscope as being fiber peel-off, debonding, and striation in the matrix. These exceptional improvements stem from the higher interfacial residual thermal stress at cryogenic temperature due to their low thermal expansion properties, which in turn promotes crack branching that increases the energy dissipation of the matrix.

Lightweight advanced structures technology for storing and transporting liquid hydrogen and other cryogenic liquids have received strong interests due to rapidly increasing demand for renewable energy, such as hydrogen. Currently, vessels used to carry super cold liquid fuels such as hydrogen and oxygen are made of metals, predominately stainless steel. Lowering the weight of these vessels is not only critical for spacecraft and space exploration, but also of great importance for reducing the cost of transporting renewable hydrogen fuels by air, land, or sea. The superior properties of fiber reinforced composite storage vessels, including lightweight, high stiffness, corrosion resistance and long lifetime, make them an extremely attractive replacement for metallic vessels. However, carbon fiber composites, which are commonly used for building aircraft and spacecrafts, have been found to suffer matrix microcracking due to the extreme cold cryogenic temperatures (below −150° C.) because of the build-up of high tensile residual thermal stress. Typical thermoset matrix materials, such as epoxy, have a much higher coefficient of thermal expansion than carbon fibers. Coupled with the significantly lower temperature of liquid hydrogen, carbon fiber composites would experience much greater residual tensile stress, around 100% or higher than what aircraft structures would experience at their lowest operating temperature (−56° C.). For example, epoxies typically have a coefficient of thermal expansion (CTE) around $50×10^{-6}K^{-1}$, significantly higher than that of carbon fibers (CTE:=$-1×10^{-6}K^{-1}$) As a result, carbon fiber composites cured at 120° C. will experience more than 110% higher thermal residual stress at the liquid hydrogen temperature of '−252.87° C. than aircraft structures would encounter at the lowest operating temperature of −56° C. This significantly higher thermal stress can cause microcracking, in the matrix of the carbon fiber composites even in the absence of mechanical loads such as internal pressure, thus rendering most aerospace-grade composites unsuitable for storing liquid hydrogen. The microcracks in the matrix may cause fuel leaks and weaken the structural integrity of the storage vessel Therefore, it is important to develop a solution to this problem so that lighter composite containers can be viable alternatives to existing metallic vessels for storing liquid hydrogen in transport, spacecrafts, carrier rockets, and passenger planes.

Methods disclosed herein include toughening epoxy matrix materials using low-thermal expansion nanomaterials to address the matrix cracking challenge and thus increase composites' resistance to microcracking at cryogenic temperatures. Some methods for improving the fracture toughness of epoxy resins, including plasticisation, rubber particles, addition of block copolymers, and creation of an inter-penetrating network (IPN), have been found to be effective down to −80° C. For example, the potential of silica nanoparticles and CSR nanoparticles for enhancing the Mode-I interlaminar fracture toughness of composites has been shown at −80° C. by up to 129% at a nano-SiO2 content of 16 wt %. About 50% increase in fracture energy at −80° C. with 25.4 wt % nano-SiO2 content has been reported. However, it is not clear how effective these methods are at cryogenic temperatures below −150° C. Alternative methods for improving the fracture toughness of thermoset polymers at cryogenic temperatures have been reported, such as adding carbon-based nano-fillers, including graphene oxide (GO) at −120° C. and −196° C., graphene nanosheet at −196° C., multiwall carbon nanotube at −196° C., nano-silica at −80° C., and core-shell rubber at −196° C. It has been found that adding 1 wt % GO/poly p-phenylenediamine (GO-PDA) hybrid mixture in epoxy resin increased the fracture toughness by 76% over neat epoxy at −120° C. It has been found that the addition of 0.5 wt % of GO increased the fracture toughness of epoxy by 58.3% at −196° C. It was reported in that compared to neat epoxy based laminate, the $Fe_3O_4$/GO modified CF/EP laminate can reduce the crack density by 60%, although the extent of increase of the fracture energy by Fe3O4/GO was not documented. An increase up to 23.7% of the compression after impact strength at −196° C. at a graphene content of 0.1 wt. % has been reported. An increase in impact strength up to 48% at −196° C. at a MWCNT content of 0.5 wt. % has been found. It has been reported that GO and GO/Fe3O4 fillers gave carbon-epoxy laminates a good micro-cracks resistance at cryogenic temperature of −196° C. Fe3O4/GO were able to reduce micro-cracks formation in laminates during cryogenic thermal cycles due to its low CTE One significant issue with the use of nano-particles to toughen fiber composites is the filtering effect by the structural fibers, such as carbon fibers, which are densely packed to achieve high volume fraction and hence mechanical strength and stiffness. With a typical average distance between adjacent carbon fibers of less than one microns, carbon fibers would filter out fillers greater than a certain size and length. Therefore, to avoid or minimize the fiber filtering effect, it is vital to select small and short nanoparticles. However, since the toughening performance of nanoparticles typically scales proportionally with their length up to a critical value, it is not clear whether small-size nanoparticles are effective in toughening high-strength carbon fiber composites. Some 2D nanofillers such as graphene nanoplatelets and large-size ID nanofillers such as carbon nanofibers, carbon nanotube and silver-nanowires have also been found to increase resin viscosity and filtering effects, which in turn would cause clogging of the flow channels by the accumulation of the nanoparticles during resin infusion.

Two different types of zero-dimensional nanoparticles, i.e., nano-$SiO_2$ and nano-CuO, which have a diameter less than 50 nm and low coefficient of thermal expansion can be selected. Although nano-$SiO_2$ has been reported to toughen CF-epoxy laminated composites but all previously reported tests were limited to −80° C., and no report can be found in the literature on their performance at cryogenic temperatures below −150° C. Similarly, nano-CuO have been reported to toughen epoxy matrix at room temperature but not at cryogenic temperature. Interestingly, nano-CuO has been reported to possess a negative coefficient of thermal expansion (CTE) of $-36 \times 10^{-6}$K. The incorporation of negative thermal expansion nanomaterials in a polymer matrix can lower its effective CTE, thus narrowing the mismatch in the thermal expansion coefficients of the matrix and carbon fibers, and hence lowering the thermal stresses in the matrix. An added benefit of nanoparticles with negative or low CTE than the polymer matrix is that a compressive radial stress may develop between the particles and the matrix, which may suppress or delay disbonding to a higher operating load and increase energy dissipation at cryogenic temperature.

To further suppress the disbonding of nanoparticles from the matrix, which in turn encourages more energy dissipation through the formation of matrix shear bands, the surface of CuO was functionalized with polydopamine (PDA) coating. PDA coating can modify the surface of metal, polymer, fiber, and ceramic by producing an adherent polydopamine coating on them to serve as versatile platform for surface-mediated reactions. In particular, coating clay particles with PDA improved the thermomechanical properties of the epoxy resin even at a very low inorganic loadings of 1.4 wt %. It has been reported that coating CNTs with a PDA layer strengthened their interfacial interactions with epoxy matrix and also reduced self-agglomeration of CNTs. As a result, stress and heat transfer between the CNTs and the polymer matrix was improved that increased the mechanical and thermal properties. The effects of the nanoparticles on the fracture toughness of the epoxy at room and cryogenic temperatures were characterized using single-edge-notch bend (SENB) tests. Identification underlying fracture toughening mechanisms was carried out by observing the fracture surfaces using scanning electronic microscope.

To demonstrate the effectiveness of zero-dimension nano-SiO2 and nano-CuO with and without PDA coating in toughening carbon fiber reinforced composites, laminates with stacking sequences of [±55]$_8$ and [±35]$_8$ were manufactured using a vacuum assisted resin infusion technique, with the original and modified epoxy resin. Double cantilever beam (DCB) tests were conducted at room temperature and cryogenic liquid nitrogen temperature (CT) of −196° C. to characterize the improvements in the fracture toughness of carbon-epoxy composites. The results show that method presented herein is highly effective in toughening the epoxy at cryogenic temperature, which will prove beneficial in suppressing or eliminating matrix cracking in carbon fiber composites. Therefore, the present disclosure is of significance to lightweight carbon fiber composite tanks for storing liquid hydrogen as well as thermal-stress induced matrix cracking problem in low-cost, rapid-cure composites useful needed for transport applications.

Figure 1A:
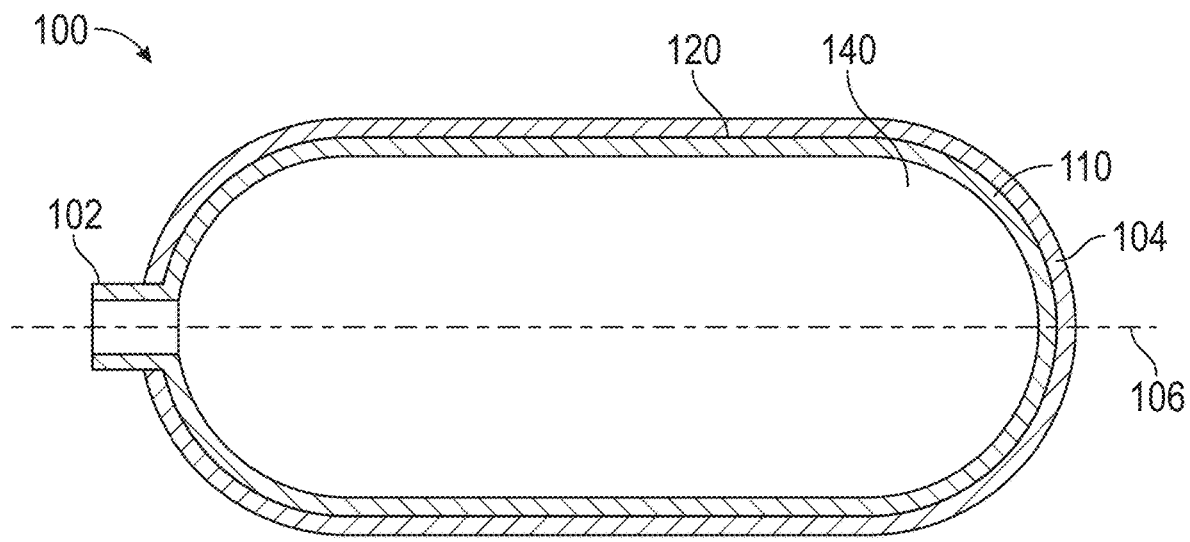
FIG. 1A illustrates a cross-sectional view showing a storage vessel.

FIG. 1 illustrates a cross-sectional view showing an embodiment of a storage vessel according to the present disclosure. High-pressure storage vessels may be made by wrapping fiber composites around a vessel body, which can be used as a mandrel. For example, a storage vessel 100 can include a shell 120 formed as a fiber-reinforced resin layer, which includes a reinforced fiber impregnated in resin. The shell 120 can be positioned on, over, and/or about a surface of a substantially cylindrical liner 110. For example, a storage vessel 100 can include a liner 110 configured to enclose a gas or liquid. The shell 120 can provide support to liner 110. The storage vessel 100 may have one of a variety of shapes, including cylindrical, spherical, or combinations thereof. The storage vessel 100 may be axially symmetric about a principal axis extending along a longitudinal length of storage vessel 100. According to at least some aspects of some implementations, as shown in FIG. 1A, the storage vessel 100 may comprise cylindrical region and two dome regions at opposing ends of the cylindrical region. Other shapes are contemplated and considered within the current disclosure.

As shown in FIG. 1A, the vessel body 110 can include, form, and/or be connected to an open end 102 and/or a closed end 104. According to at least some aspects of some implementations, the liner 120 can provide a polar boss and/or a blind boss. The liner 110 may be composed of plastic, metal (e.g., aluminum alloys, magnesium alloys, and iron), and/or other materials to contain a gas or liquid. According to at least some aspects of some implementations, the liner 110 may be impermeable with respect to selected contents of storage vessel 100. According to at least some aspects of some implementations, the shape of the liner 110 may contribute to the shape of storage vessel 100.

At least one of the open end 102 and the closed end 104 may be disposed near at least one end of liner 110. For example, as shown in FIG. 1A, the open end 102 may be disposed at one end and the closed end 104 may be disposed at an opposite end. In some embodiments, open ends may be disposed at each of two ends of the liner 120. The open end 102 may provide selective access to the interior portion of liner 110 for providing or discharging the contents of storage vessel 100. The open end 102 may be configured to provide a connection to a valve system. The open end 102 may be made of metal or other durable material. The closed end 104 may provide support to the liner 110. The open end 102 and the closed end 104 may allow the liner 110 to be supported and rotated about its principal axis as a mandrel to form the shell 120.

The storage vessel 100 further includes the shell 120. The shell 120 provides support to liner 110 against deformation and rupture due to pressure from within liner 110. According to at least some embodiments, the shell 120 may comprise alternating layers of reinforced fiber resin. The shell 120 can optionally include a multilayer structure. For example, the shell 120 can include a circumferential orientation layer, in which a reinforced fiber resin is wound around the liner 110, such that the orientation direction of the reinforced fiber resin of the shell 120 is the circumferential direction of the liner 110. Additionally or alternatively, the shell 120 can include an axial orientation layer in which the reinforced fiber resin 3 is wound around the circumferential orientation layer such that the orientation direction of the reinforced fiber resin of the shell 120 is the axial direction of the liner 110. A number and a thickness of each layer can be determined depending on an intended use, a kind of content, and a size of the storage vessel, and the like.

Figure 1B:
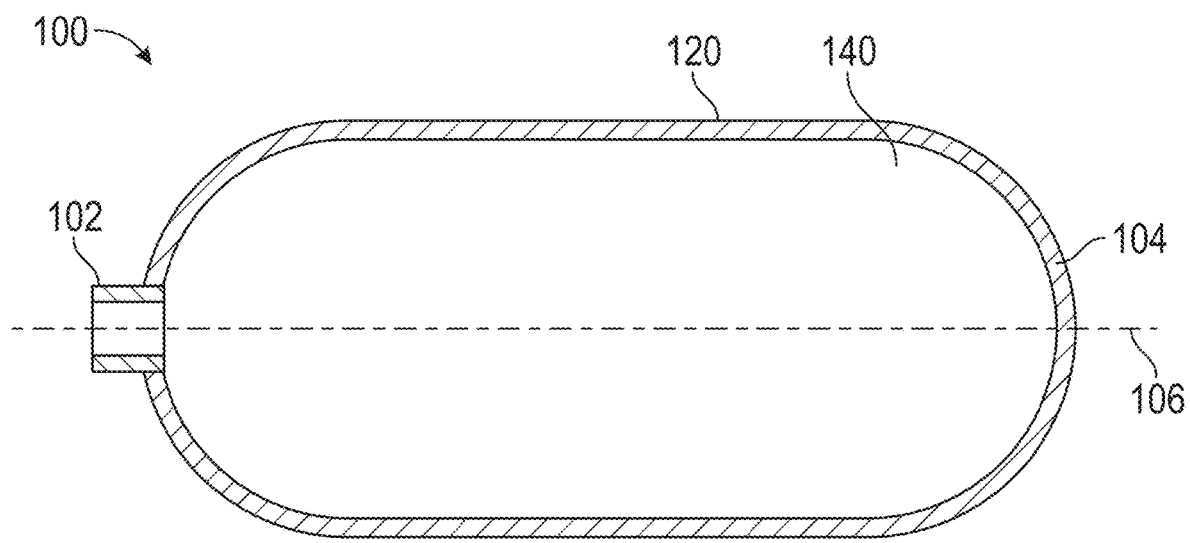
FIG. 1B illustrates a cross-sectional view showing a storage vessel.

As shown in FIG. 1B, a storage vessel 100 can omit a liner, such that the shell 120 defines both outer and inner surfaces of the storage vessel 100. By further example, the shell 120 can define the interior chamber 140 of the storage vessel 100. The shell 120 can provide adequate support and impermeability to retain a gas or liquid stored therein.

Figure 2:
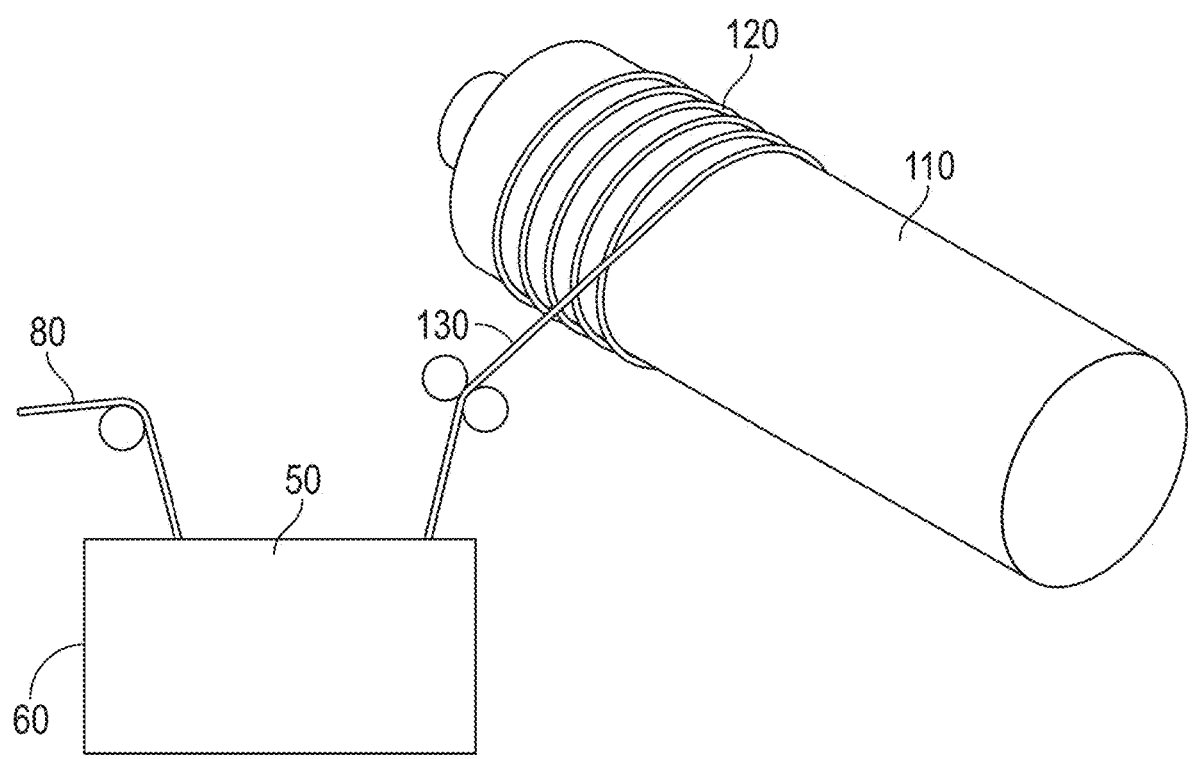
FIG. 2 illustrates a system and method for producing a storage vessel.

A storage vessel, such as that of FIG. 1A of 1B, can be formed by a process described herein. As shown in FIG. 2, a reinforced fiber resin 130 is obtained by impregnating the reinforced fiber 80 in a resin matrix 50 in a container 60. While the liner 110 rotates, for example in a circumferential direction, the reinforced fiber resin 130 is wound around the liner 110 to form the shell 120. The direction, pitch, angle, and arrangement of the reinforced fiber resin 130 forming the shell 120 can be controlled by operating the rotation of the liner 110 and the position of the reinforced fiber resin 130. Other operations can be performed, such as forming an axial orientation layer with the reinforced fiber resin 130 adjusted to the longitudinal direction of the liner 110. The storage vessel 100 can be heated, for example, in a heating furnace. The fiber reinforced resin layer of the shell 120 can be hardened by such a heat treatment.

Where the storage vessel 100 has a shell 120 that defines both outer and inner surfaces of the storage vessel 100, as illustrated in FIG. 1B, the liner 110 or other shape (e.g., mandrel) onto which the shell 120 is formed can be removed. For example, after the shell 120 is formed (e.g., heated and/or cured), the liner 110 or other mandrel can be dissolved such that the shell 120 remains to define the interior chamber of the storage vessel 100.

In some embodiments, a storage vessel can include a shell that is formed by fibers wound about an axis and infused with a resin matrix. The fibers can include carbon fiber, glass fiber, aramid fiber, boron fiber, PBO fiber, and the like. The resin matrix can include particles coated with a polymer and distributed within a resin. The particles can include metal particles, such as cupric oxide and silica. The polymer can include polydopamine (PDA) and the like. The resin can include an epoxy resin, vinyl ester resin, phenol resin, acrylic resin, and the like.

In some examples, a diglycidyl ether of bisphenol A, F (DGEB-A, F) based epoxy resin (RAKU TOOL EL-2203) with an amine-based curing agent (EH 2970-1) from GMS Composites, Australia was used. The viscosity of the resin at 25° C. is 400-600 mPa s, making it suitable for resin infusion and filament winding. The shelf life of the resin is greater than 24 months at 20° C. with a gel time of 1 h at 25° C. By curing at 25° C. for 24 h followed by a post cure at 120° C. for 16 h, the epoxy can attain a glass transition temperature (Tg) up to 110-120° C.

Nanopox F 400, a DGEB-A epoxy solution containing 40 wt % nano-$SiO_2$ particles with an average particle diameter of 20 nm, was supplied by Evonic Industries. Nano-CuO particles, which were spherical in shape with an average diameter of ~50 nm, were obtained from Sigma Aldrich. Cross-ply laminates with a fiber architecture of $[\pm 55]_8$ were manufactured by infusing the original and modified epoxy into unidirectional (UD) carbon fiber fabrics (CK 1223JL 205 GSM Toray) from Allnex Composites. The cured laminates were machined into double cantilever beam (DCB) samples for testing.

To functionalize the surface of nano-CuO particles with a PDA coating, 0.26 g of TRIS buffer solution was added with 0.6 g of dopamine monomer (DA) in 200 mL of water at 30° C. under mechanical stirring. In-situ polymerisation of PDA proceeded when 1.2 g of nano-CuO particles were mixed with the solution with stirring for 12 h. During this process, the dopamine monomer simultaneously oxidized and polymerized in the buffer solution, forming a layer on the particles 10 (e.g., nano-CuO) through π-π stacking interactions. FIG. 3A shows a schematic for the polymer (e.g., PDA) coating 20 on particles 10 (e.g., nano-CuO). As shown in FIG. 3B, the original and PDA-coated nano-CuO particles were then mixed with epoxy resin 40 using probe sonication. The distribution of coated particles 30 (e.g., PDA-coated nano-CuO) in epoxy resin 40 to form a resin matrix 50 is shown schematically in FIG. 3B. For comparison, un-functionalized nano-CuO particles were also used to manufacture another modified epoxy. Nano-SiO2 from Nanopox F400-epoxy mixture were dispersed in the epoxy resin by mixing nanosilica-epoxy masterbatch by agitating with a stick for 10 minutes. All liquid resin mixtures degassed for 30 minutes prior to cure.

In some embodiments, the particles 10 can be generally spherical. In some embodiments, the particles 10 (e.g., with or without a polymer coating) can have a diameter or other maximum cross-sectional dimension that is less than about 100 nm, 90 nm, 80 nm, 70 nm, 60 nm, 50 nm, 40 nm, 30 nm, 20 nm, 10 nm, and/or any other value and/or ranges between any two or more of the foregoing. Any two or more particles 10 can vary in size. For example, the particles 10 can vary within a range that is characterized by any two of the foregoing values.

The coated particles 30 (e.g., with or without a polymer coating) can form a portion of the resin matrix 50 when combined with the resin 40. For example, the coated particles 30 can form about 1 wt %, 2 wt %, 3 wt %, 4 wt %, 5 wt %, 6 wt %, 7 wt %, 8 wt %, 9 wt %, 10 wt %, 15 wt %, 20 wt %, 25 wt %, 30 wt %, 35 wt %, 40 wt %, 50 wt % of the resin matrix 50, and/or any other value and/or ranges between any two or more of the foregoing.

Figure 3C:
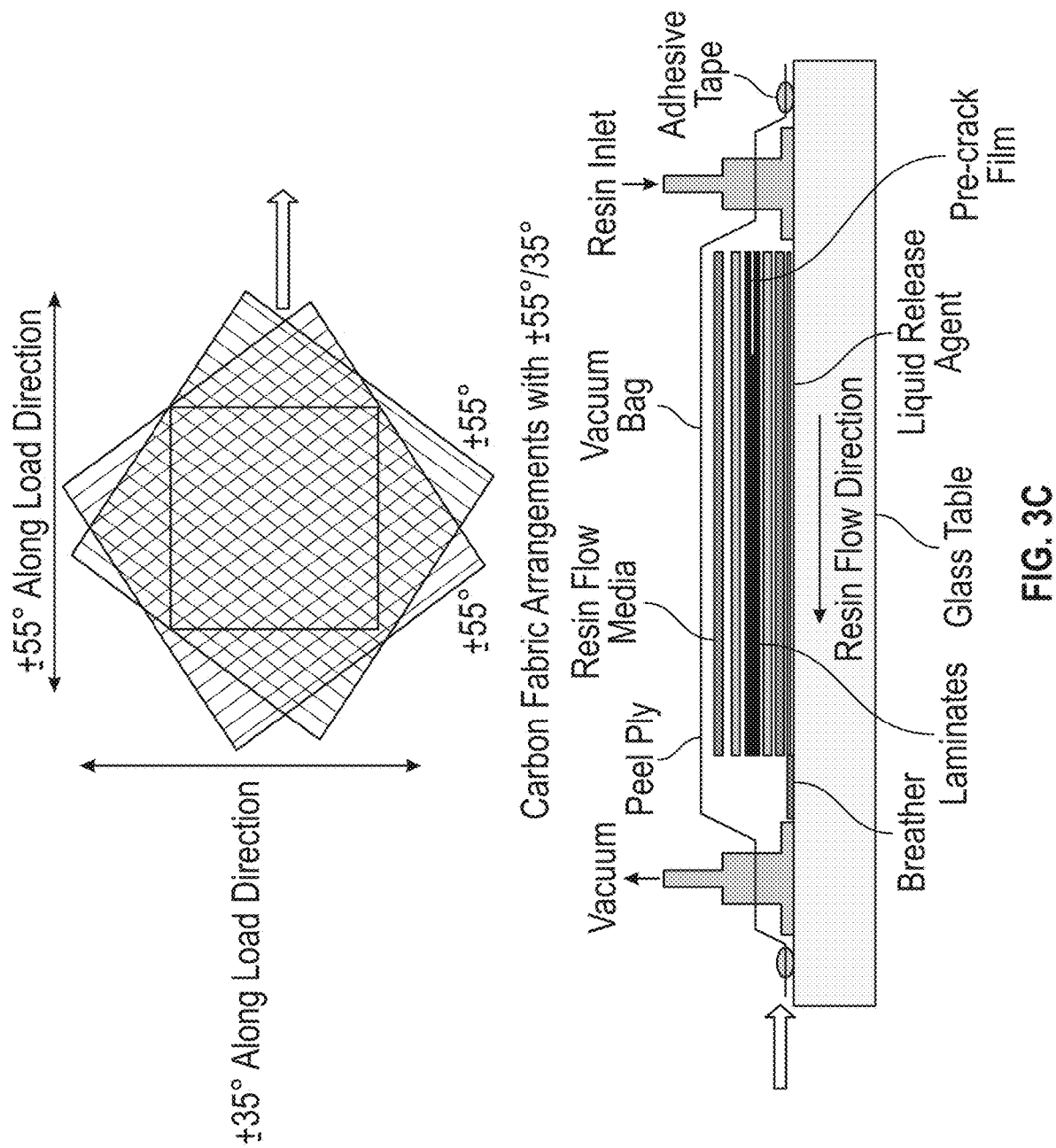
FIG. 3C illustrates a vacuum assisted infusion process for the angle-ply laminates.

Using the original epoxy resin and the modified epoxy by nano-SiO$_2$, nano-CuO, and PDA-coated nano-CuO particles, carbon-epoxy composites were manufactured by vacuum infusion process. To achieve 4 wt % nanosilica in the epoxy resin, 26 g out of 200 g Raku Tool EL 2203 epoxy resin was replaced with Nanopox F 400 (Evonic Industries). Dry carbon fiber plies were first cut into 250 mm×250 mm long pieces. A total 16 plies were laid up in a [±55°]$_s$ fiber architecture, representing typical filament winding angles used for making storage vessels, on a glass table, which was waxed to facilitate demoulding the laminate after curing. A 50 mm long precrack was formed by inserting a 25 μm thick polytetrafluoroethylene (PTFE) film between the 8th and 9th ply at one end of the stack. The stack was then assembled with the required bagging materials, including the infusion mesh, peel ply, breather and vacuum bag. A full vacuum was then applied. Resin infusion was then carried out using the three different epoxy resins at a vacuum pressure of 1 atm. The infusion process is illustrated in FIG. 3C. After an initial cure at RT for 12 h, the laminates were post cured at 120° C. for 14 h. All the laminated composites were cut into DCB test samples, measuring 200 mm×20 mm×3.4 mm, using a multicam CNC router.

The coefficient of thermal expansion (CTE) of nano-CuO particles were characterized using the X-ray diffraction (XRD) technique at different temperatures, using a PAnalytical instrument (PANalytical Empyrean 1) equipped with a temperature controllable cryostage. Powder diffraction patterns at temperatures ranging from 300K down to 20K at an interval of 20K (temperature was held steady for 300 s at each testing temperature) were collected over the 2θ range of 20-80° in a step angle of 0.02°. Performing the Rietveld refinement for each XRD pattern using the HighScore Plus software yielded the lattice parameters at different temperatures with R-factors (Rwp) from 10.0% to 12%.

The linear CTE value (αL) can be derived from the XRD patterns according to Eq.

$$\alpha_L = \frac{1}{L_0}\frac{dL}{dT} \quad (1)$$

where $L_0$ is the initial lattice parameter and dL/dT is the rate of change in the lattice parameter with respect to temperature. The volumetric CTE value can be calculated from the XRD patterns according to Eq. (2):

$$\alpha_V = \frac{1}{V_0}\frac{dV}{dT} \quad (2)$$

where $V_0$ is the initial volumetric lattice parameter and dV/dT is the rate of change in the lattice parameter with respect to temperature.

Figure 4A:
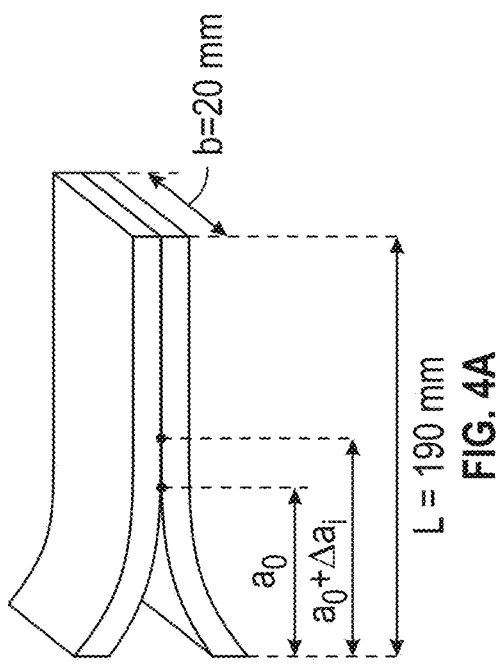
FIG. 4A illustrates a double cantilever beam (DCB) test.

To measure the mode I interlaminar fracture toughness of the composites, double cantilever beam (DCB) tests were carried out in accordance with ASTM D5528-13 using a crosshead speed of 4 mm/min. The DCB test involved applying a monotonically increasing tensile load to the pre-cracked arms of the specimen fitted with loading tabs. The GI values can be calculated using the following method:

$$G_I = \frac{3P\delta}{2b(a+|\Delta|)}\frac{F}{N} \quad (3)$$

where P denotes the applied load, δ the crack opening displacement, α the total delamination crack length measured from the loading point, and b the sample width. The terms F and N are two correction factors for large displacements and the presence of end load blocks, respectively. The term |Δ| is a correction factor for vertical displacement and rotation at the crack tip, which is determined from the compliance data. The delamination length was measured using a travelling optical microscope. Three to five samples were tested for each type of composite material. FIG. 4A shows the delamination crack, including the molded pre-crack, saw cut, and sharp crack made using a razor blade. On continuation of the loading, load and displacement values in the first 5 mm of delamination growth were recorded in approximately 1 mm crack growth increment. Subsequently, load and displacement data were recorded at every 5 mm growth increment, until the delamination crack has propagated at least 45 mm from the tip of the pre-crack. Afterwards, measurements were taken at every 1 mm increment of crack growth for the last 5 mm of delamination propagation, up to a total delamination length of 50 mm beyond the initial tip of the pre-crack.

Figure 4B:
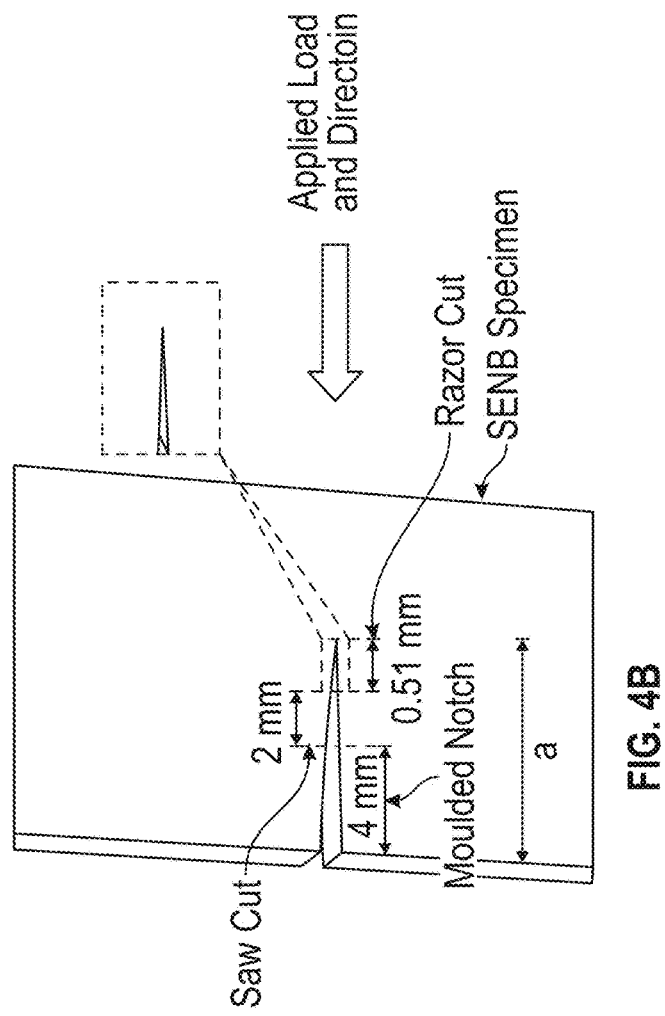
FIG. 4B illustrates a single edge notch bending (SENB) test showing the details of the pre-crack.
Figure 4C:
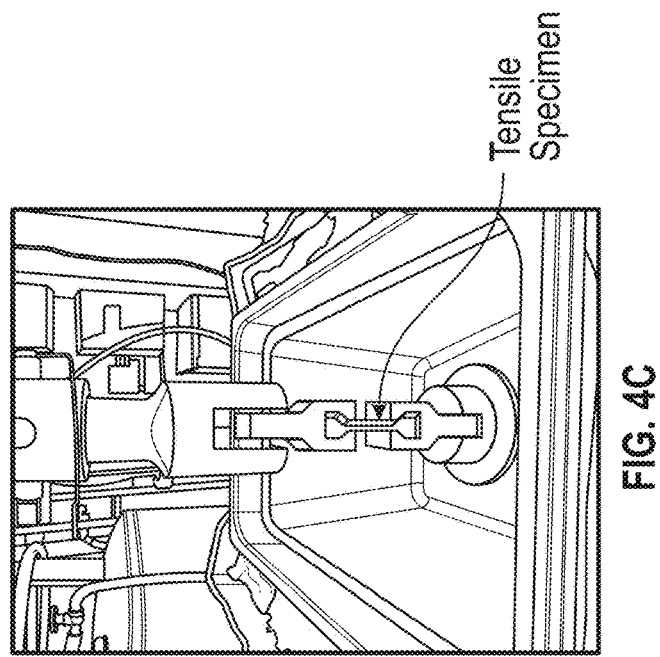
FIG. 4C illustrates a tensile testing setup.
Figure 5A:
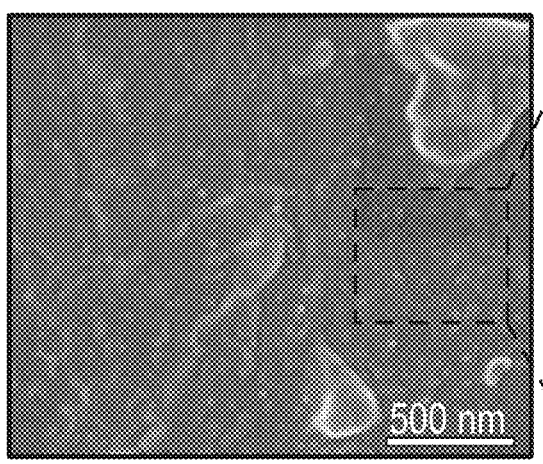
FIG. 5 illustrates (a) SEM image of nSiO2 particles dispersed in epoxy, (b) high magnification SEM images nSiO2 in epoxy, (c) TEM image of nCuO particles, (d) high magnification TEM image of nCuO, and (e) TEM image of PDA-coated nCuO particles, and (f) TEM image of PDA-coated nCuO in epoxy.
Figure 5B:
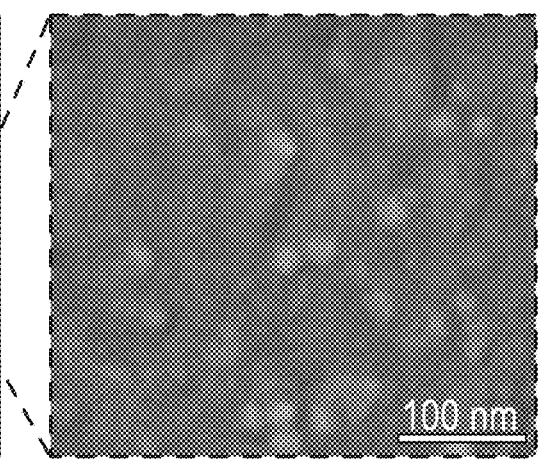
Figure 5C:
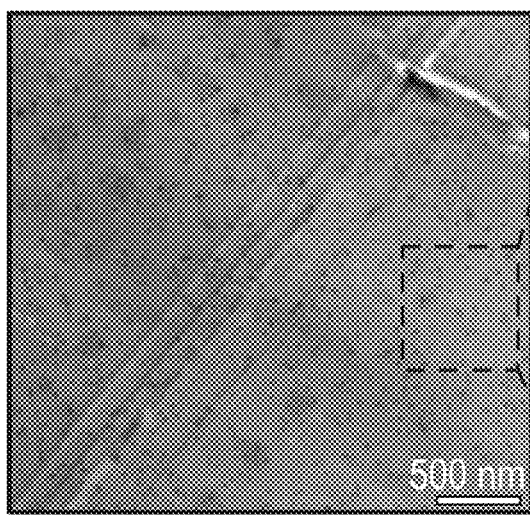
Figure 5D:
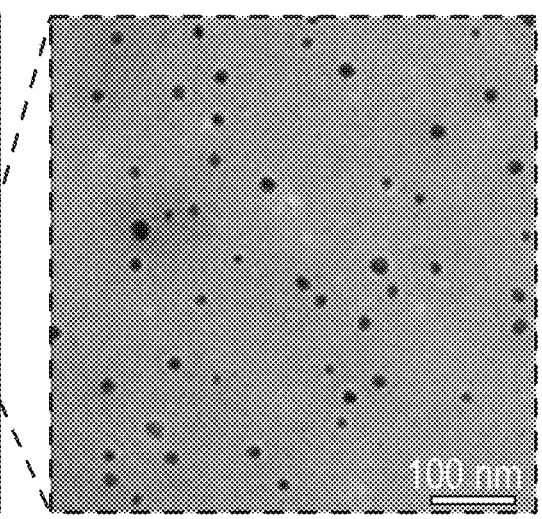
Figure 5E:
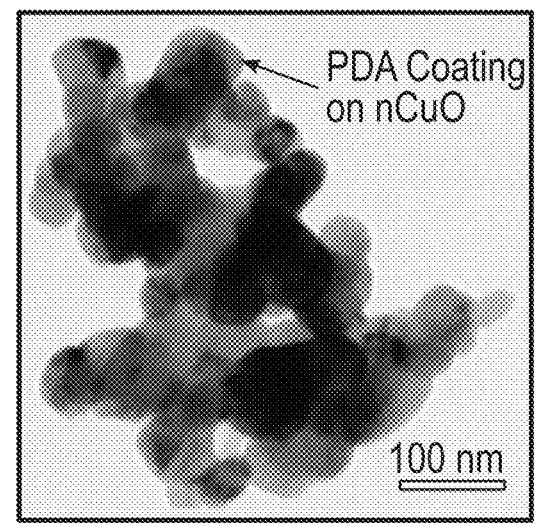
Figure 5F:
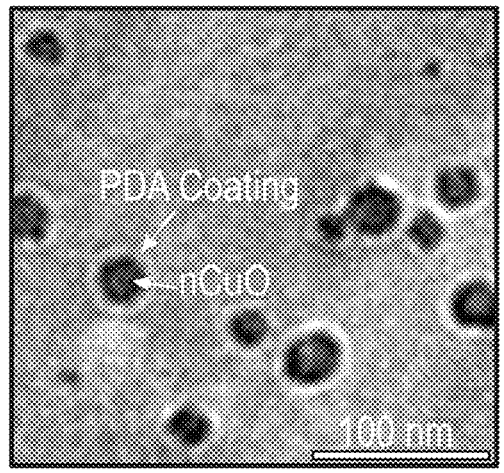

Single edge notch bending (SENB) tests of original epoxy and nanoparticle-modified epoxy were carried out in accordance with ASTM D5045-14 at a crosshead speed of 10 mm/min. The dimensions of the SENB specimens were 58 mm×13 mm×6.5 mm. FIG. 4B shows an SENB test specimen where a 4 mm long notch was created by casting the samples using a mould. The next 2 mm slit was created by a hacksaw. By carefully tapping a razor blade inserted in the slit, a very sharp crack of 0.5 to 1 mm was created to give a total crack length around 6.5-7 mm. Tensile tests of the samples were carried out (specimen size of 2 mm×4 mm with a gauge length of 32 mm) a crosshead speed of 1 mm/min using a purpose-built grip shown in the FIG. 4C.

The fracture surfaces of the composites after tests were examined using a FEI Nova Nano SEM 230 field-emission scanning electron microscope. The microstructure of the nano-CuO particles was analysed using a transmission electron microscope (FEI Tecnai G2 20 TEM).

Both types of nanoparticles, nano-SiO$_2$ and nano-CuO, are well dispersed in the epoxy matrix, as evidenced by SEM and TEM images shown in FIG. 5. In particular, sections (a) and (b) show the cross-sectional view of nano-SiO$_2$-epoxy nanocomposites, while sections (c) and (d) show the TEM micrographs of nano-CuO-epoxy nanocomposites. TEM images of PDA-coated nano-CuO particles and their dispersion in the epoxy are shown in section (e) and section (f), respectively.

Figure 6A:
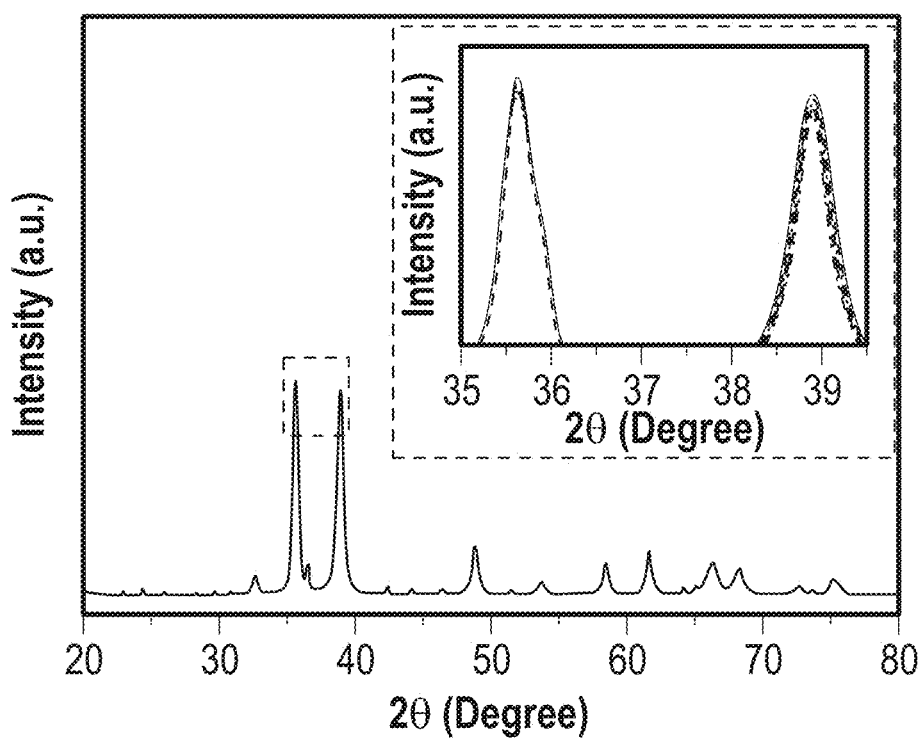
FIG. 6A illustrates X-ray diffraction data for CuO nanocrystals at different temperatures (from 20K to 300K at an interval of 20K).
Figure 6A:
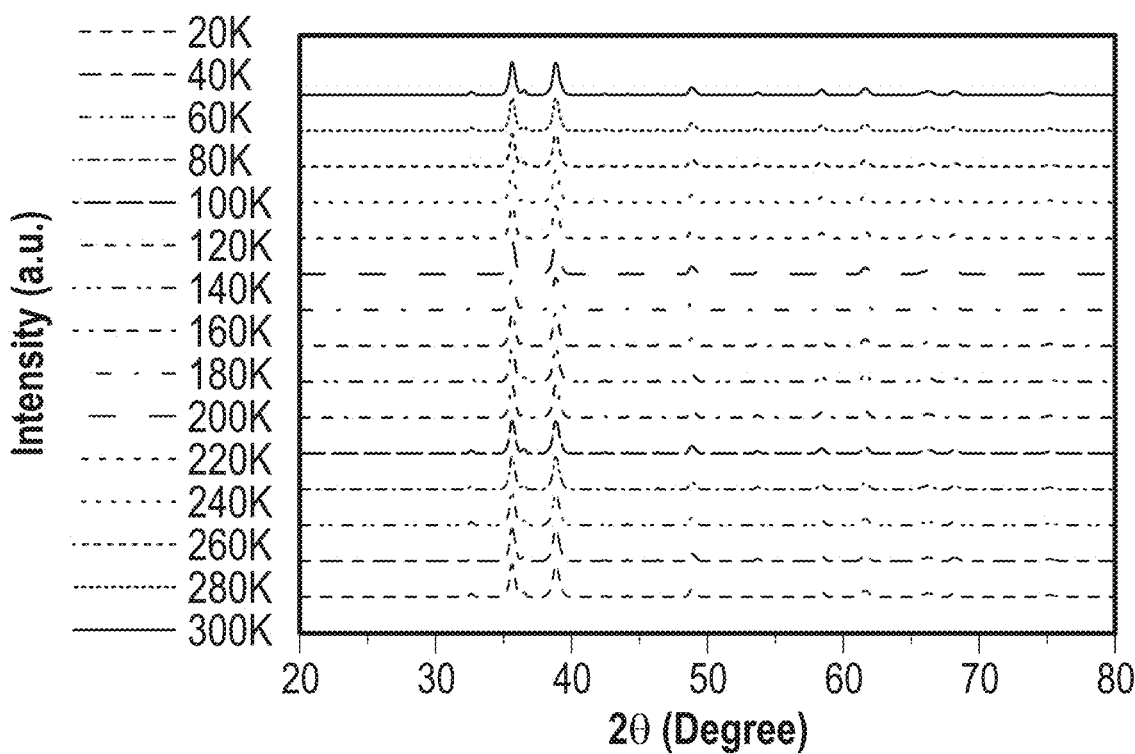
Figure 6B:
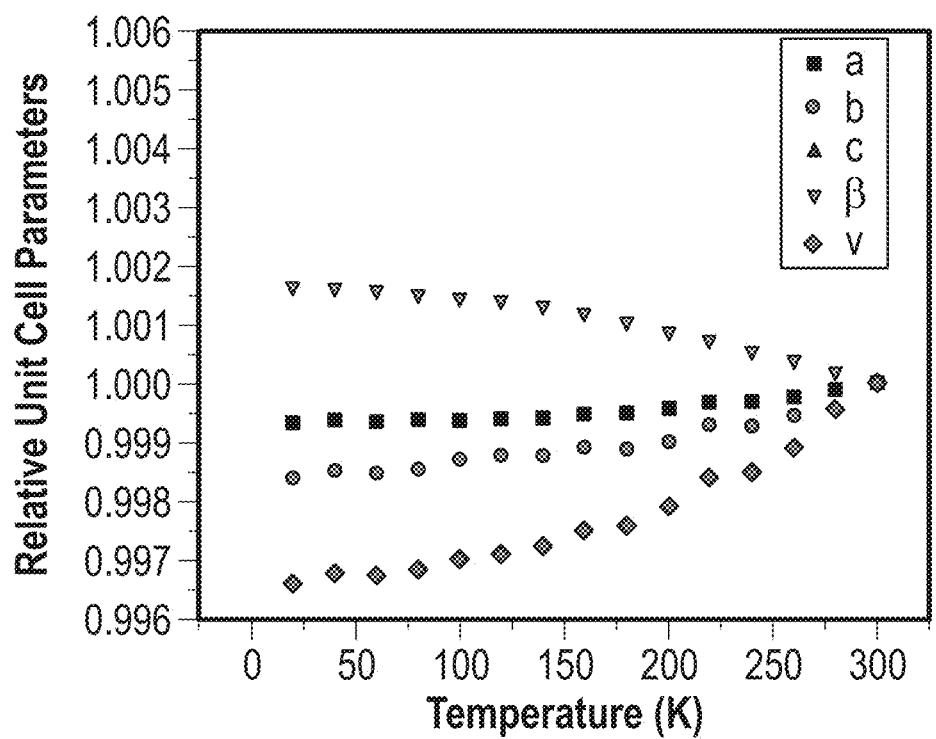
FIG. 6B illustrates normalized lattice parameters for monoclinic CuO nanocrystals relative to the values at 300 K (a=4.6838 Å, b=3.4179 Å, c=5.1334 Å, b=99.4119° and V=81.0729 Å3).
Figure 6C:
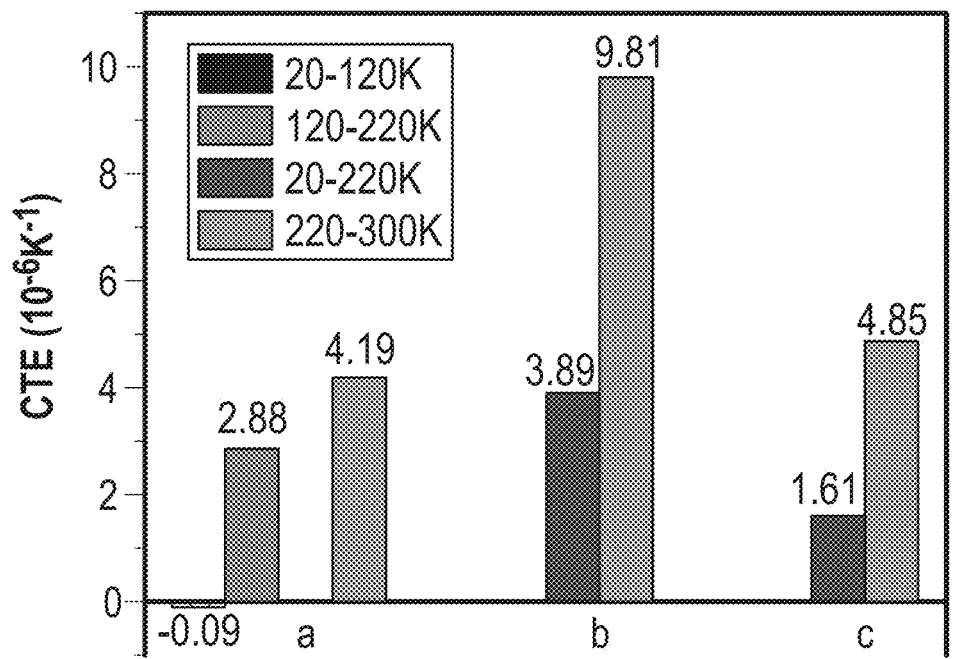
FIG. 6C illustrates linear CTE along the a, b, and c axis.
Figure 6D:
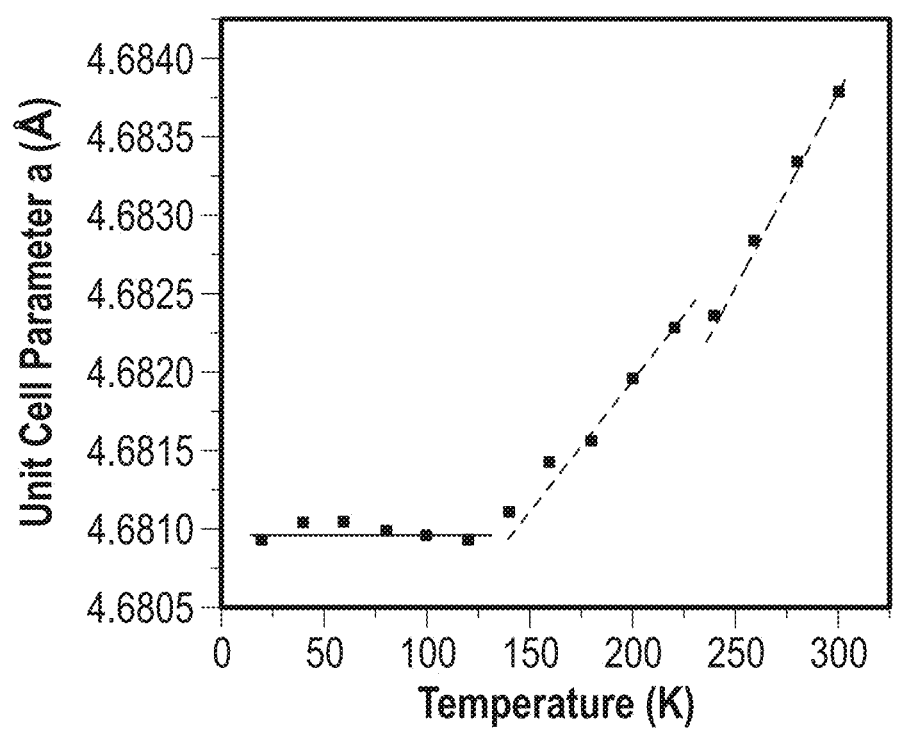
FIG. 6D illustrates the volume of the unit cell for nanocrystals of CuO versus temperature.

Data measured using the XRD allowed the determination of lattice constants of the nanocrystals at various temperatures, which then make it possible to quantify the coefficient of thermal expansion (FIG. 6A). The lattice parameters calculated from the Rietveld refinement are shown in FIG. 6B, which shows that nano-CuO crystals exhibit a slight increase with temperature in the lattice parameters a, b, and c as displayed by the normalized values in FIG. 6B. In particular, the lattice parameter 'a' exhibits a trilinear relationship with temperature, which exhibits a significant change in slope at 120K and slight change around 220K as shown in inset of FIG. 6B. The first slope change is an anomalous behaviour which was also observed by other authors for nano-CuO but at a lower temperature of 50K. The second slope change, also reported in the literature, can be attributed to the two successive phase transitions in bulk CuO as an antiferromagnetic compound, one around TN1=230K pertinent to an incommensurate ordering with a helical period, followed by another transition around TN2=213K, which is a first-order commensurate ordering. This can also be attributed to a phase transition from the cubic α-phase to the β-phase, which corresponds to a disordered cubic lattice as reported in. Therefore, the linear CTE of CuO nanocrystals (αL) can be represented by three values for lattice parameter a, in the temperature ranges of [20K, 120K], [120K, 220K] and [220K, 300K]. For the lattice parameter b and c, the linear CTE of CuO nanocrystals (αL) and volumetric CTE (αV), have two values in the temperature range of [20K, 220K] and [220K, 300K], respectively. The respective values of αL for the three unit-cell orientations and αV are shown in FIG. 6C and FIG. 6D. The volumetric CTE (αV) was calculated to be 4.85×10−6K−1 and 15.9×10−6K−1, respectively. The measured values are significantly higher than the negative CTE (β=−1.1×10−4K−1) reported by others for microcrystals of approximately 5 nm and larger particles of 10 μm in diameter. The high NTE effect was attributed to the significant enhancement of magnetostriction effect in the nanocrystals. However, the CTE of nano-CuO particles was measured to be positive albeit showing a slightly negative local linear CTE along the 'a' axis within the temperature range of 20K to 120K (FIG. 6C). The results are consistent with other results indicating a positive linear CTE of nano-CuO particles at temperatures between 20K and 300K.

Elastic properties of the original epoxy are presented in FIG. 15, indicating that this epoxy material possesses higher tensile strength and modulus at cryogenic temperature than at room temperature by 4.5% and 46%, respectively. This is most likely due to the increase in the binding forces between molecules when the temperature decreases: a higher stress is required to break the molecular bond at cryogenic temperature. The higher Young's modulus at CT than at RT is most likely due to the reduced mobility of the molecules when the temperature decreases from RT to CT, thus increasing the rigidity of the molecular chains.

The fracture toughness of the neat epoxy (NE) and nano-SiO$_2$-epoxy nanocomposites with different nano-SiO$_2$ content of 2, 4, 8 and 12 wt % at RT and CT are presented in FIGS. 16A and 16B. The results show the epoxy and its nano-SiO$_2$ nanocomposites are 15% brittler at CT than at RT. Higher amounts nanoparticles generally lead to an increase in the fracture toughness of nanocomposites and the percentage of increase is higher at CT than that at RT with 8 wt % giving the highest increase of 187%.

The fracture toughness of nano-CuO-epoxy nanocomposites with different nano-CuO content of 1, 2, 4 and 8 wt % at RT and CT are presented in FIGS. 16C and 16D. It is clear that the addition of nanoparticles increases the fracture toughness of nanocomposites, with the percentage of increase being higher at CT than that at RT. However, increasing the nano-CuO content from 1 wt % to 8 wt % yields no further increase in the fracture toughness.

The fracture toughness of PDA-coated nano-CuO-epoxy nanocomposites with different PDA-coated nano-CuO content of 1, 2, 4 and 8 wt % at RT and CT are presented in FIGS. 16E and 16F. It is clear that the addition of nanoparticles increases the fracture toughness of nanocomposites, with the percentage of increase being higher at CT than that at RT. Again, increasing the PDA-coated nano-CuO content beyond 1 wt % seems to yield no further increase in the fracture toughness.

Figure 7A:
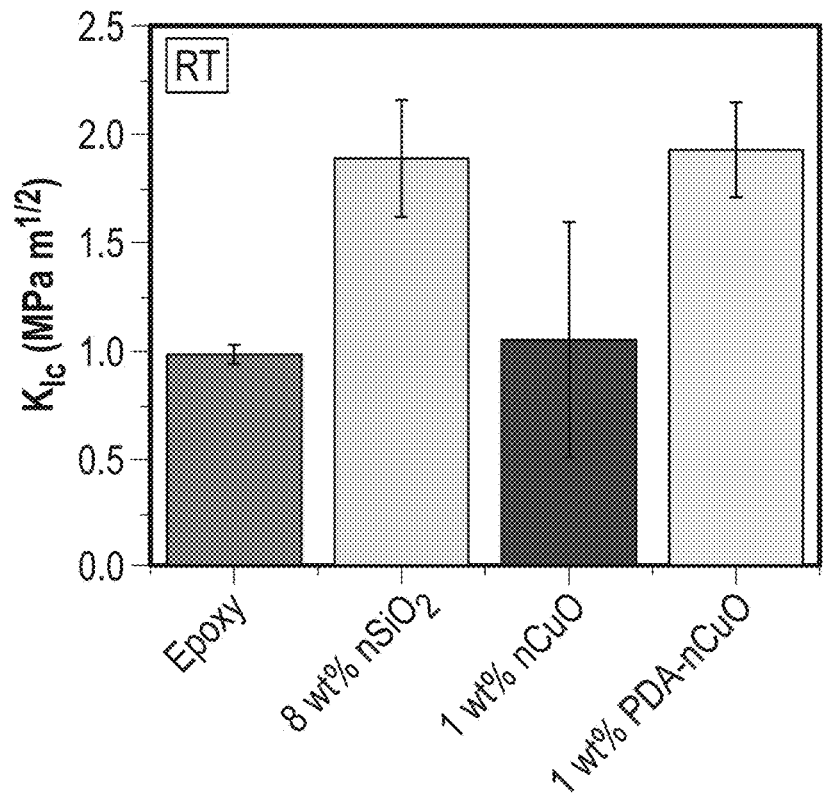
FIG. 7A illustrates fracture toughness of neat epoxy (NE) and nanocomposites at RT.
Figure 7B:
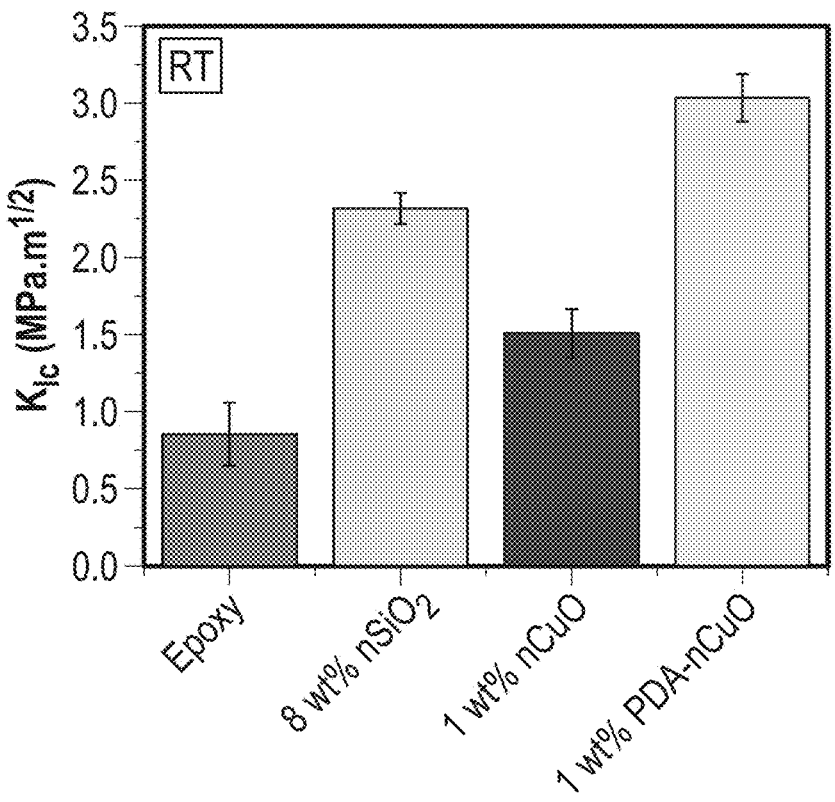
FIG. 7B illustrates fracture toughness of neat epoxy (NE) and nanocomposites at CT.
Figure 8A:
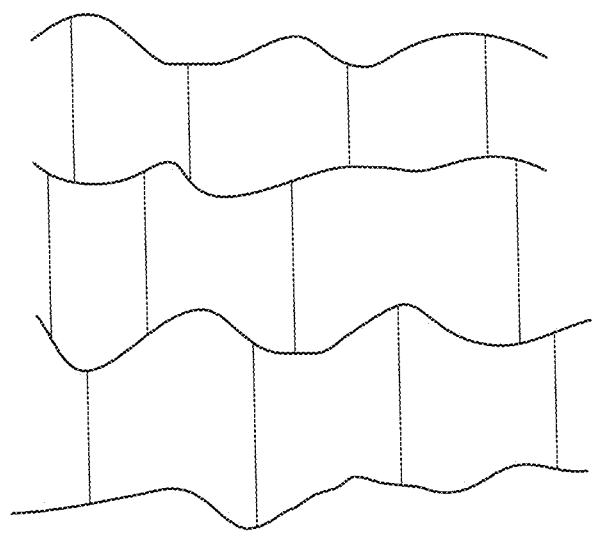
FIG. 8A illustrates crosslinking network of neat epoxy.
Figure 8B:
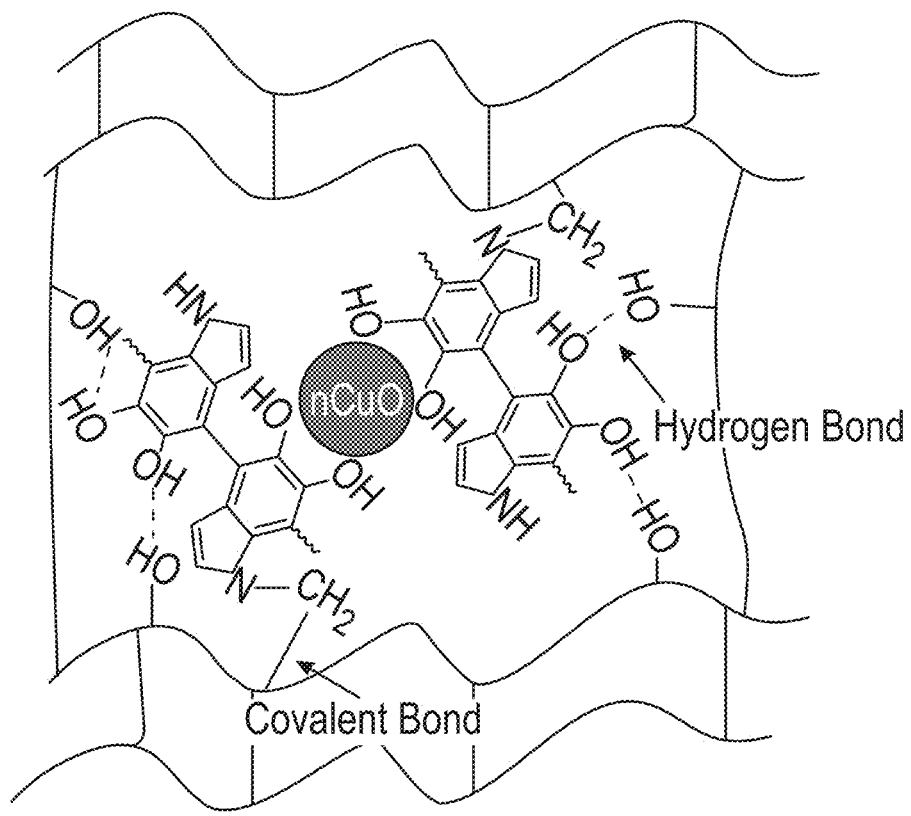
FIG. 8B illustrates crosslinking network of enhanced crosslinking network by PDA-coating on nCuO.

A comparison of the relative effectiveness of nano-SiO$_2$, nano-CuO, and PDA-coated nano-CuO particles in enhancing the fracture toughness of the epoxy is presented in FIGS. 7A and 7B. It is clear that the incorporation of nanoparticles increases the fracture toughness of the nanocomposites and the ratio of increase is higher at CT than at RT. Although nano-CuO showed little beneficial effect on the fracture toughness, coating them with PDA has clearly yielded dramatic improvements (up to 260% at CT). This huge increase is due to the stronger bonding between the ammine groups in the PDA coating with the epoxide group in the matrix material. The highest improvement of fracture toughness corresponds to PDA-coated nano-CuO particles, which is most likely due to the improved nanoparticle-matrix interaction by the formation of covalent and hydrogen bonding of the ammine and hydroxyl groups of PDA with the epoxy network as shown in the schematic of FIGS. 8A and 8B. This is consistent with the observed rougher fracture surface of the SENB test specimens toughened by PDA-coated nano-CuO than the epoxy nanocomposites contain the original nano-CuO particles (FIGS. 9A-D).

Figure 9A:
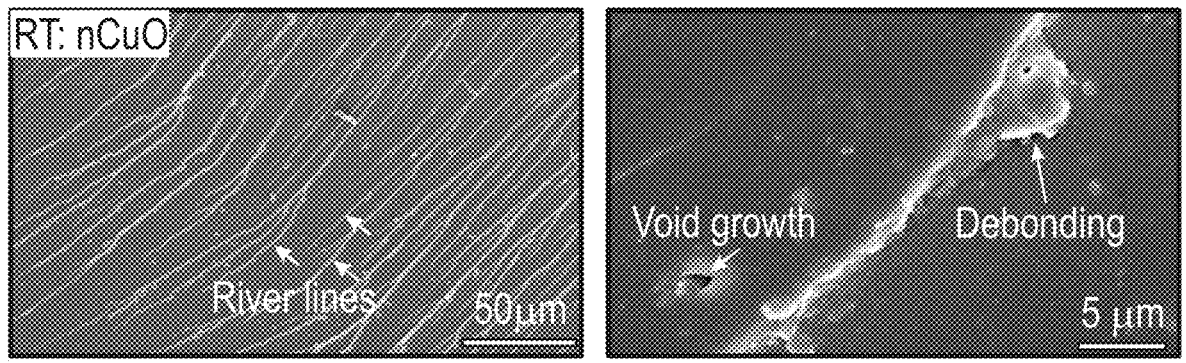
FIG. 9A illustrates SEM micrographs of the fracture surface of the epoxy nanocomposites with nCuO at RT.
Figure 9B:
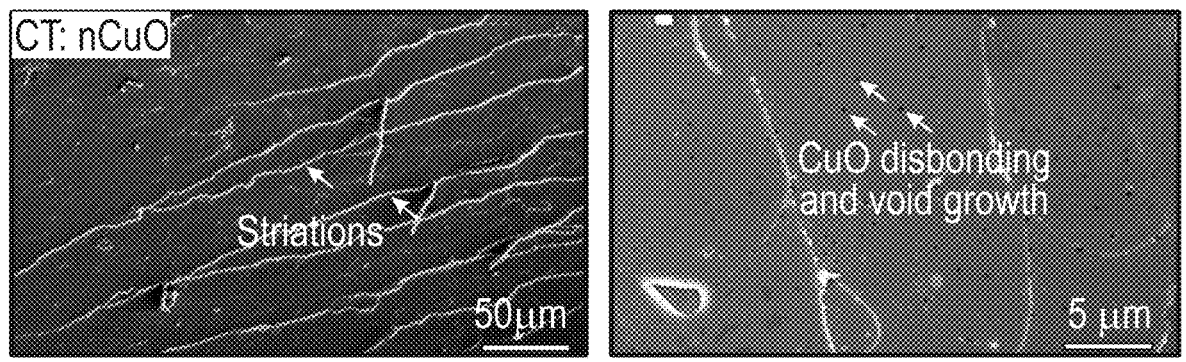
FIG. 9B illustrates SEM micrographs of the fracture surface of the epoxy nanocomposites with nCuO at CT.
Figure 9C:
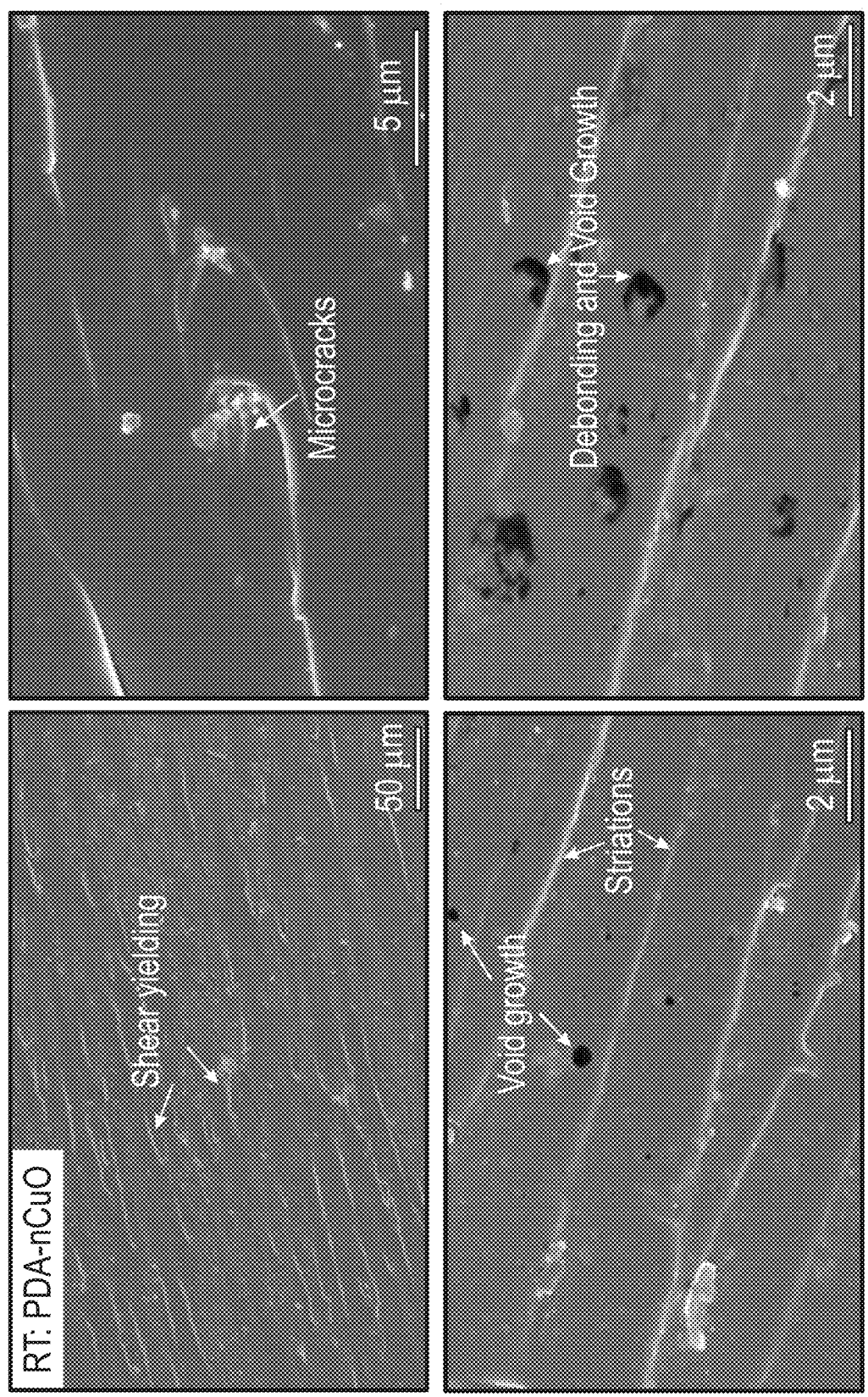
FIG. 9C illustrates SEM micrographs of the fracture surface of the epoxy nanocomposites with PDA-coated nCuO at RT.
Figure 9D:
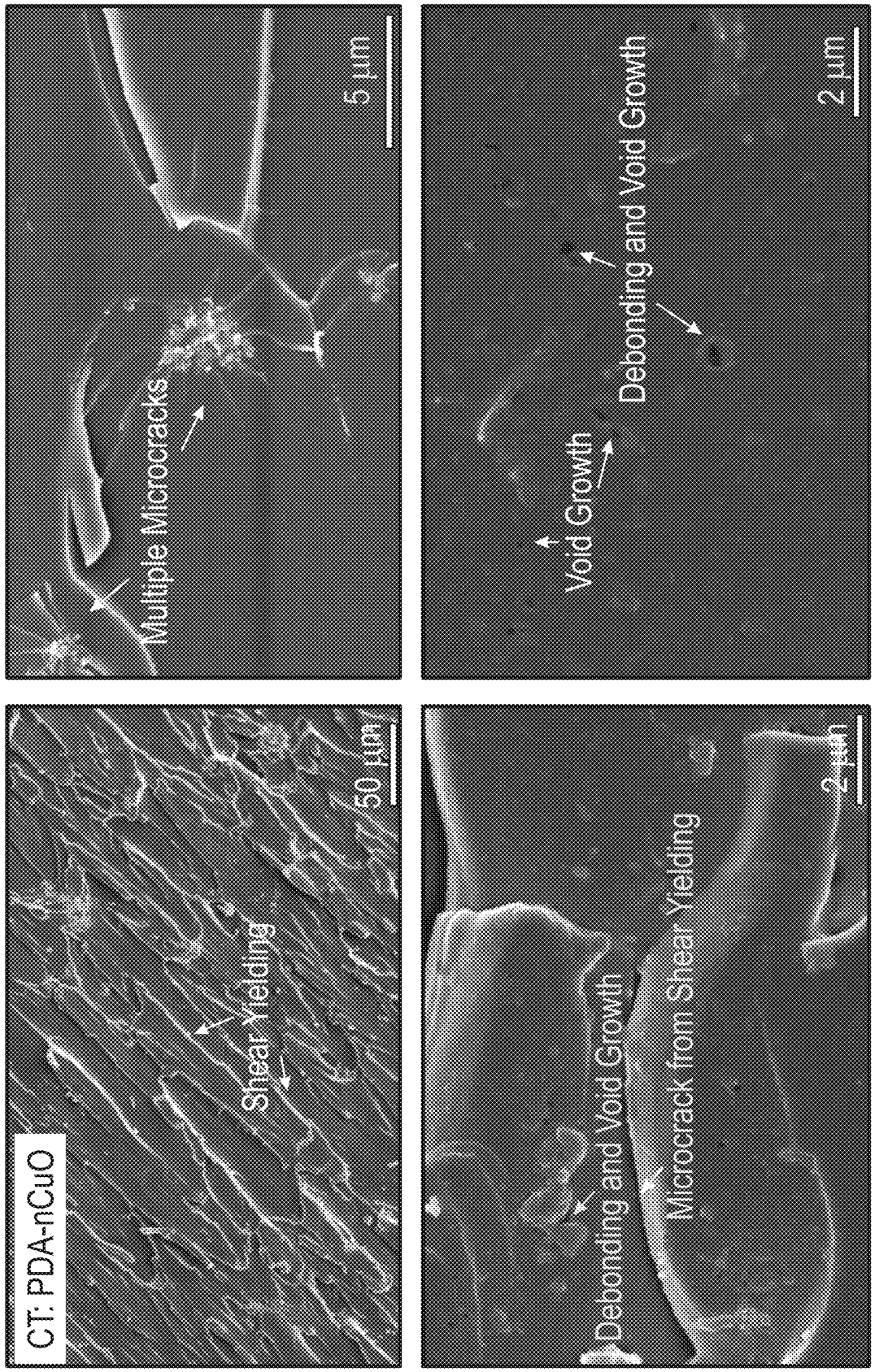
FIG. 9D illustrates SEM micrographs of the fracture surface of the epoxy nanocomposites with PDA-coated CuO at CT.

Mechanisms for the toughening effects of nano-CuO and PDA-coated nano-CuO can be identified by SEM observations of the fracture surfaces. FIGS. 9A-D show the SEM micrographs of the fracture surfaces of epoxy nanocomposites containing nano-CuO and PDA-coated nano-CuO at RT and CT. A river pattern is visible with some void growth and debonding of nanoparticles on the fracture surface of nano-CuO-epoxy nanocomposite at RT in FIG. 9A, while striations in the matrix and debonding of the nanoparticles and resultant void growth are more evident at CT in FIG. 9B. For PDA-coated nano-CuO-epoxy nanocomposites at RT, shear yielding, microcracking, debonding of the nanoparticles and resultant void growth can be seen in FIG. 9C. By contrast, more extensive shear yielding with very densely spaced multiple
microcracks are clearly visible along with debonding of the nanoparticles and resultant void growth at CT (FIG. 9D).

Figure 10:
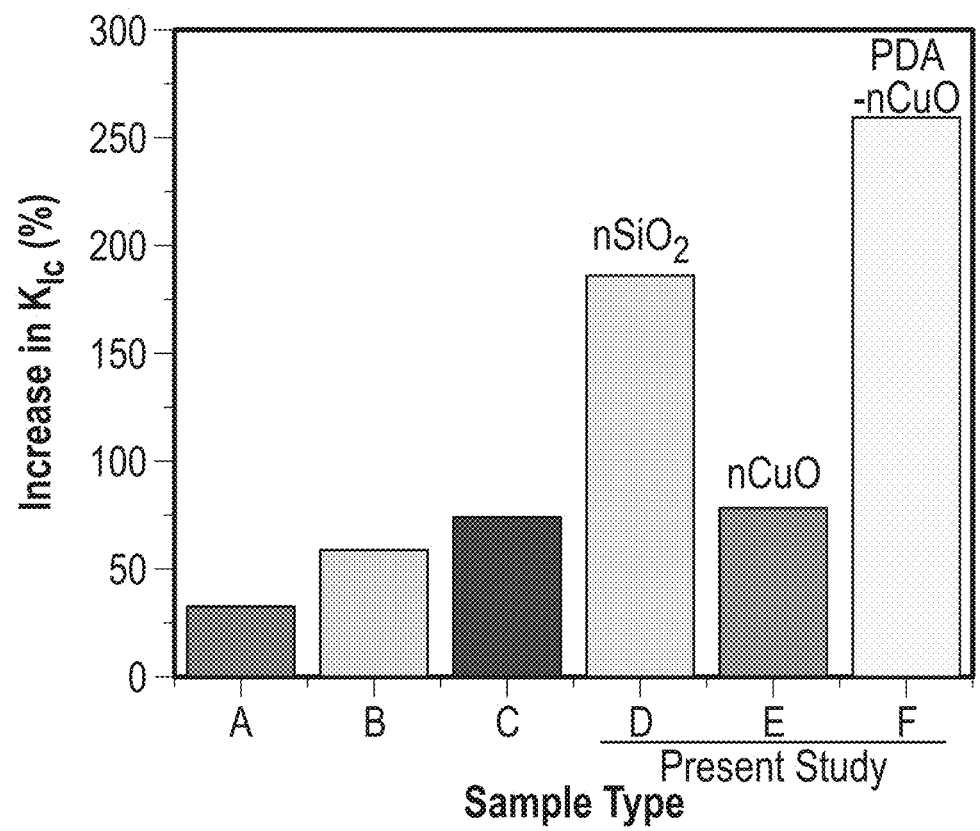
FIG. 10 illustrates percentage increase in $Ki_{Ic}$ values of nanocomposites at CT compared to neat epoxy at CT: (A) 5.4 vol % core shell rubber (CSR), (B) 0.27 vol % GO, (C) 0.12 vol % $Fe_3O_4$/GO, (D) 4.5 vol % nSiO2 (E) 0.19 vol % nCuO (F) 0.19 vol % PDA-coated nCuO.

A comparison of the percentage increase in the KIc values by the two nanoparticles (nano-SiO2 and nano-CuO with and without PDA coating) with those reported in the literature is presented in FIG. 10. The increase up to 260% in fracture toughness achieved using epoxy modified by PDA-coated nano-CuO particles is significantly greater than the highest increase of 75% achieved by 0.12 vol % Fe3O4/GO particles reported in the literature.

Using the respective variables given in Table 1, the thermal residual stress acting on the nanoparticles developed when the nanocomposite undergoes a temperature change of ΔT can be estimated by $$\sigma_c^T = \frac{4(\alpha_{np} - \alpha_m)(1 + v_{np})G_m}{2(1 - 2v_{np})\left(\frac{G_m}{G_{np}}\right) + 3(1 + v_{np})} \Delta T \tag{4}$$

where $\alpha*+$ is the coefficient of thermal expansion (CTE) of nanoparticles (nano-SiO$_2$ or nano-CuO), $\alpha$, is the CTE of epoxy resin, $v*+$ is the Poisson's ratio of nano-SiO$_2$ or nano-CuO, G, is the shear modulus of epoxy, $G*+$ is the shear modulus of nanoparticles (nano-SiO$_2$ or nano-CuO) and ΔT is the temperature difference between cryogenic and RT. During cryogenic LN2 testing (ΔT=−217° C. corresponding to cooling from RT of 23° C. to LN2 temperature of −196° C.) of nano-SiO2-epoxy composites, the residual stress is calculated to be −9.38 MPa as per Eq 4. For nano-CuO toughened polymer, the thermal residual stress is −8.68 MPa with the CTE value obtained, as given in Table 1. These results suggest that the nanoparticles are under high compressive stress at CT. However, as the Young's moduli of the epoxy nanocomposites were measured at a very low stress levels, they are independent of the thermal stress. On the other hand, the radial compressive stress between the particles and the matrix increases the tensile strength of the nanocomposites tested at CT, compared with nanoparticles of high CTE that would result in positive or low level of compressive residual stress.

The Young's modulus of unmodified (control) epoxy (Em) was measured to be 1.56 GPa and 2.28 GPa at RT and CT, respectively. The addition of nano-SiO2, nano-CuO, or PDA-coated nano-CuO increased the modulus, since the moduli of silica (E=70 GPa) and CuO (E=106.6 GPa) are much higher than that of the epoxy. The moduli of the epoxy containing nanoparticles, normalized by that of the unmodified epoxy, are plotted against the weight percentage of nanoparticles in FIGS. 17A-D. The increase in the normalized Young's modulus as a function of nanoparticle weight percentage is approximately linear and all nanoparticle epoxy systems follow a similar relationship within the experimental variation.

The modulus values correlate well with the predictions of Nielsen model, which gives the modulus, $E_c$, of the nanoparticle modified epoxy system as:

$$E_c = \frac{1 + (k_E - 1)\beta v_{np}}{1 - \mu \beta v_{np}} E_m \tag{5}$$

where k− is the generalised Einstein coefficient, and β and μ are constants and their detailed measurement system can be found in Appendix A. The predictions for nano-SiO2, nano-CuO, and PDA-coated nano-CuO at RT and CT are given in FIGS. 17A-D. In some examples, the experimental Young's modulus of nano-SiO2 at RT are in good agreement with Nielsen no-slippage model. Similarly, the reported Young's modulus of nano-SiO2 at RT is also in good agreement with the Nielsen no-slippage model. However, Nielsen no-slippage model under-predicts the Young's modulus of silane treated nano-SiO2 at RT.

The normalized tensile strength and Young's modulus of nanocomposites at RT and CT in terms of the volume fraction of the nanoparticles are plotted in FIGS. 17A-D, including the current results and those on nano-SiO2 and on silane-treated nano-SiO2 are shown in FIGS. 17A-D. These results show that the normalized tensile strength increases with the volume fraction of nanoparticles and the increase is greater for PDA-coated nano-CuO in some examples and silane-treated nano-SiO2. The increased tensile strength obtained at CT may be due to the introduction of compressive thermal residual stress that the nanocomposite needed to overcome to disbond the particles and then rupture. For the spherical nanoparticles (nano-SiO2 and nano-CuO) in some examples, the effect of thermal stresses are calculated using Eq 6 where it is assumed that the spherical particles have no particle-particle interactions in an infinite, homogenous matrix. The strength results compare well with the predictions by an empirical relationship:

$$\sigma_c = \left[\frac{1 - v_{np}}{1 + 2.5 v_{np}} \sigma_m\right] \exp(B v_{np}) \tag{6}$$

where B is an empirical constant that depends on particle surface, particle density, and interfacial bonding energy. The B value was calculated in some examples using the experimental tensile strength values of nano-SiO2, nano-CuO, and PDA-coated nano-CuO nanocomposites at RT and CT as shown in FIGS. 17A-D. The B value is higher at CT when compared to RT and higher for CuO and PDA-coated nano-CuO nanocomposites when compared with nano-SiO2 nanocomposites.

As can be seen from the SEM micrograph of FIGS. 18A-F, the primary toughening mechanism in the nano-SiO2-epoxy and nano-CuO-epoxy nanocomposites is debonding of the particles enabling subsequent plastic void growth of the surrounding epoxy polymer. For PDA-coated nano-CuO-epoxy nanocomposites the primary toughening mechanisms are (a) localized plastic shear yielding and (b) shear yielding induced microcracking which produces crack pinning and crack branching.

Figure 11A:
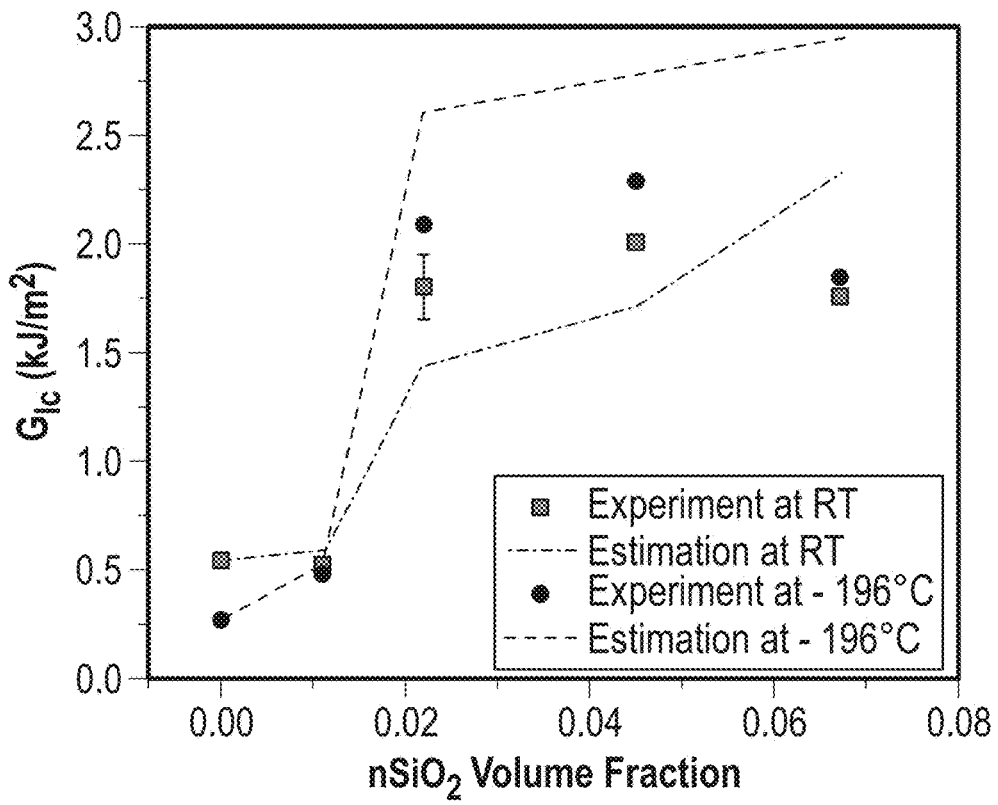
FIG. 11A illustrates comparison of the experimental and theoretically calculated fracture energies as a function of volume fraction of nSiO2 at RT and CT.

The nanoparticles are responsible for the toughening mechanisms like shear yielding and void growth; the debonding mechanism was described by Hull and Clyne. The total fracture energy of a modified polymer, GIc, can be expressed as the sum of the fracture energy of the unmodified polymer, Gcu, plus the contributions from the three main toughening mechanisms:

$$G_c = G_{cu} + \psi \tag{7}$$

with $$\psi = \Delta G_s + \Delta G_{db} + \Delta G_v \tag{8}$$

where the terms on the right-hand side of Eq. 8 represent the fracture energy contributions from localised shear-banding (s), debonding (db) of the particles, and plastic void growth (v), respectively. The calculations are summarized in Appendix B. All parameters for the model have been measured both at RT and CT. FIG. 11A shows the comparison of the experimental results and estimated fracture energies as a function of the volume fraction of nano-SiO2. It can be seen that the model provides a good estimate of the fracture energies at low nSiO2 volume fractions. FIG. 19 summarizes the contributions of different fracture mechanisms of the model compared with the neat epoxy contribution at RT and CT for nano-SiO2 versus experimental values at various volume percentages. Larger contribution was seen from void growth both at RT and CT, which are consistent with the SEM observations (FIGS. 18A and 18B) of visible void growth. By comparison, debonding contribution by spherical particles is always either equal or lower than the volume fraction of the nanoparticles.

Figure 11B:
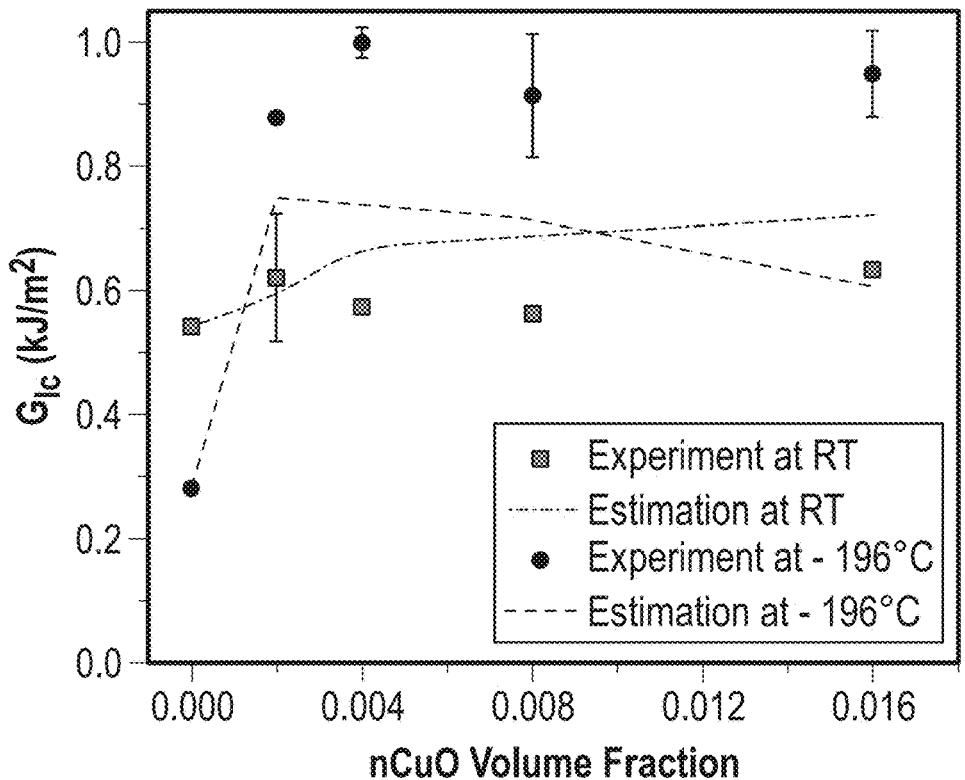
FIG. 11B illustrates comparison of the experimental and theoretically calculated fracture energies as a function of volume fraction of nCuO at RT and CT.

FIG. 11B shows a comparison of the experimental and estimated fracture energies as a function of the volume fraction of nano-CuO at RT and CT. It can be seen that the model predicts the fracture energies reasonably well particularly at low nano-CuO volume fractions. FIG. 20 summarizes the contributions of different fracture mechanisms of the model compared with the neat epoxy contribution at RT and CT for nano-CuO versus experimental values at various volume percentages. As can be seen from the SEM micrographs (FIGS. 18C and 18D), both void growth and debonding mechanisms are visible at RT and CT. Larger contributions both at RT and CT were seen from void growth than debonding as spherical particles generally dissipate relatively small amount of energy during debonding.

Figure 11C:
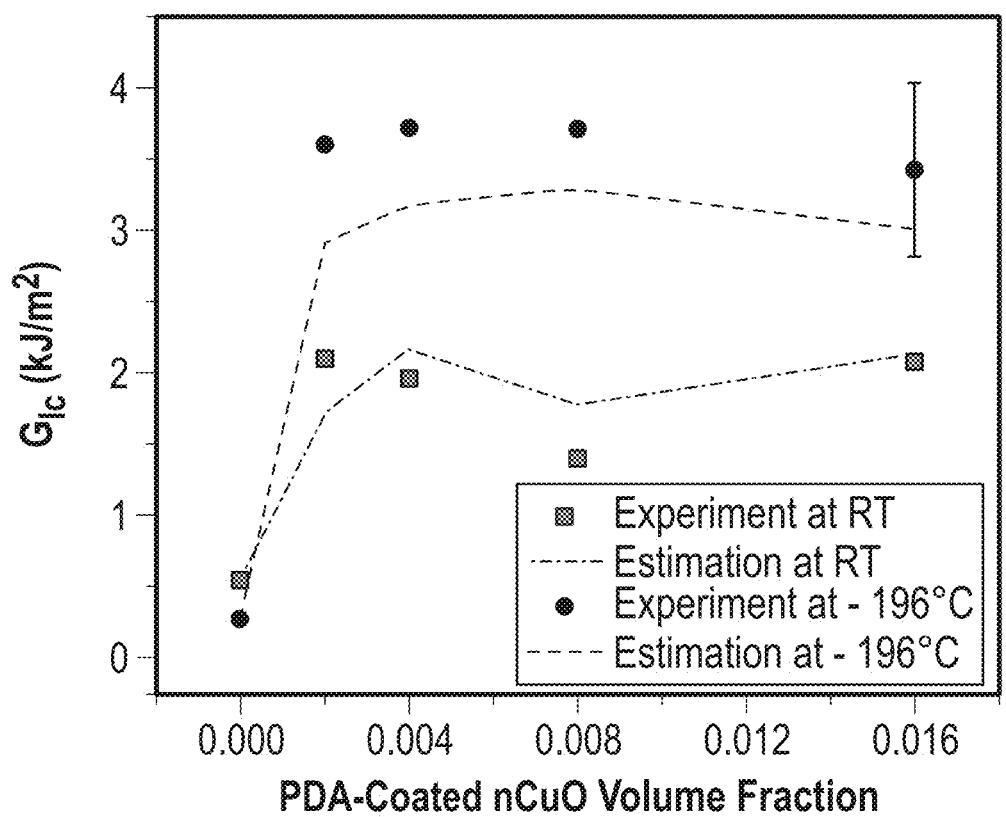
FIG. 11C illustrates comparison of the experimental and theoretically calculated fracture energies as a function of volume fraction of PDA-coated nCuO at RT and CT.

Finally, FIG. 11C shows a comparison of the experimental and estimated fracture energies as a function of the volume fraction of PDA-coated nano-CuO at RT and CT. It can be seen that the model predicts the fracture energies for PDA-coated nano-CuO very well at RT and somewhat underestimates the fracture energies at CT. From the SEM (FIGS. 18E and 18F), it can be seen that along with void growth, PDA coating also contributes to shear yielding and microcracking more significantly to the fracture energy and the contributions due to microcracking is currently not included in the model (Eq. 7). Multiple microcracks, crack pinning and deflection are a consequence of better bonding because of PDA coating on nano-CuO and these phenomena are more prominent at CT. These contributions by micro-cracking, crack pinning and crack bowing (macroscopic) are currently absent in the semi-empirical model. Development of the relevant quantitative model for these contributions is the subject of future work.

Figure 12A:
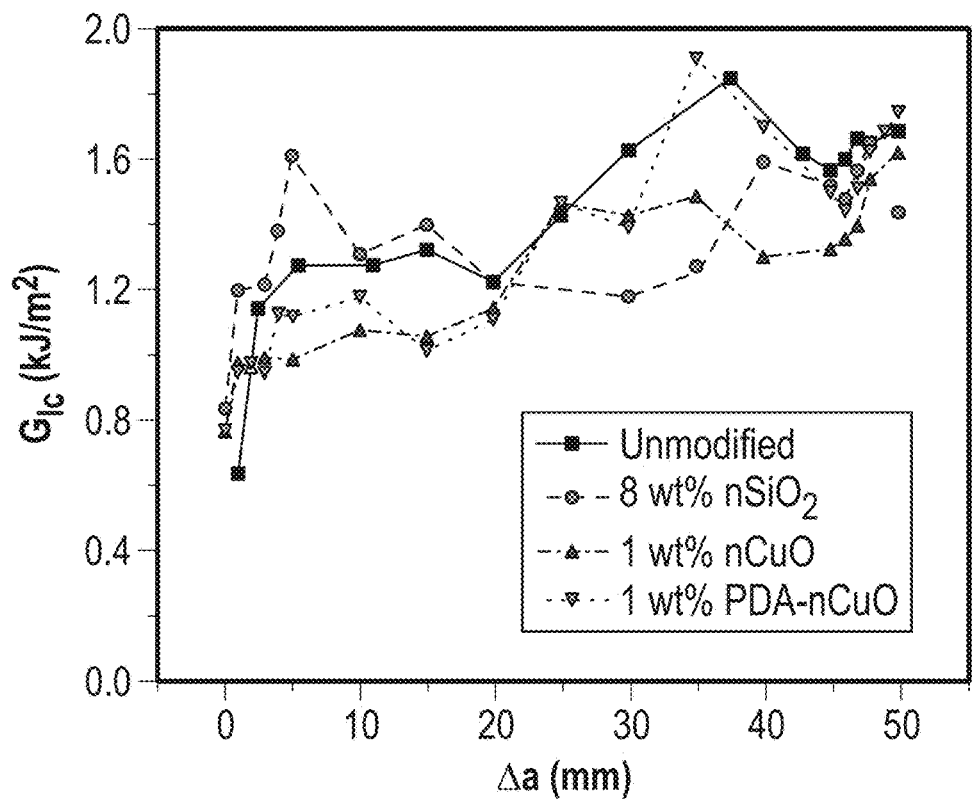
FIG. 12A illustrates R curves for unmodified CFRP (ply angle of ±55°) and CFRPs modified with 8 wt % nSiO2, 1 wt % nCuO and 1 wt % PDA-coated nCuO at RT.
Figure 12B:
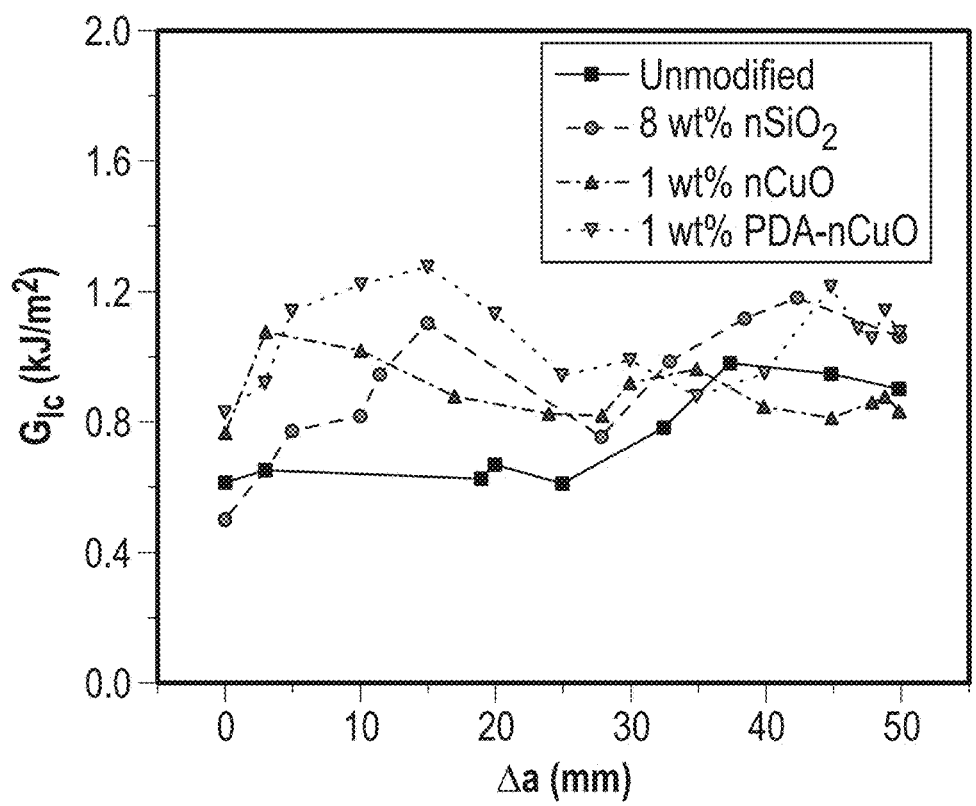
FIG. 12B illustrates R curves for unmodified CFRP (ply angle of ±55°) and CFRPs modified with 8 wt % nSiO2, 1 wt % nCuO and 1 wt % PDA-coated nCuO at CT.

The results of interlaminar fracture toughness for four different composite laminate at RT and CT are presented in FIGS. 12A-B. The laminates include unmodified laminate and modified laminate using 8 wt % nano-SiO2, 1 wt % nano-CuO, and 1 wt % PDA-coated nano-CuO. It is clear from the R curves of the unmodified and modified laminates shown in FIGS. 12A-B that the laminates show lower fracture toughness at CT than at RT, as it would be expected. The lower toughness at CT is partly due to the increased rigidity of the polymer chains that decreases energy dissipation.

PDA-coating of nano-CuO is evident from the TEM micrographs given in FIG. 5. In some examples, the PDA-coating is believed to provide increased interfacial interactions with the epoxy matrix and formed strong bonding between nano-CuO particles and the epoxy, which led to an improved stress transfer between the nano-CuO particles and the epoxy matrix, giving rise to the observed increase in critical energy release rate. Similar mechanism has been reported for PDA to act as a multipurpose platform for secondary reactions or further improvement of surface functionality.

Significant differences are evident in the fracture surfaces of the laminates with epoxy resin containing the un-modified nano-CuO particles and the PDA-coated nano-CuO particles. From the fracture surface of the nano-CuO-epoxy laminates at RT (FIG. 13A), interfacial adhesive failure between carbon fibers and the epoxy matrix, such as debonding of single fibers and separation of fiber bundles, is the main failure mechanism. Fiber debonding is reported to be an indication of poor adhesion of fiber with matrix. By contrast, as CT, no fiber bundle debonding was observed on the fracture surface of the nano-CuO-epoxy composites (FIG. 13B); instead, the main failure mechanisms were single fiber debonding (fiber-matrix interface adhesive failure), fiber breakage, and matrix cohesive failure. The observed increase in the fracture energy by PAD-coated nano-CuO particles may be due to more energy being required to cause fiber fracture and matrix cohesive failure. Furthermore, for PDA-coated nano-CuO composites at RT and CT (FIGS. 13C and 13D, respectively), no single fiber and fiber bundle separations were observed; fiber breakage and matrix cohesive failure were the main failure mechanisms. While more fiber-matrix adhesive failure was seen at RT (FIG. 11C), more matrix cohesive failure was seen at CT (FIG. 13D). Thus, better fiber-resin wetting and mechanical interlocking make the interface stronger that resulted in greater increase in fracture energy at CT than at RT. Similar fracture mechanism with ZnO nanowire-carbon-epoxy laminates was previously reported. Except the nano-CuO composites at RT, all other composites showed more translaminar than interlaminar crack growth, i.e., the crack growth was not planar but through the adjacent plies. These deviations of the main crack path may also have contributed to the increase in the fracture energy of these composites particularly at CT.

Figure 14A:
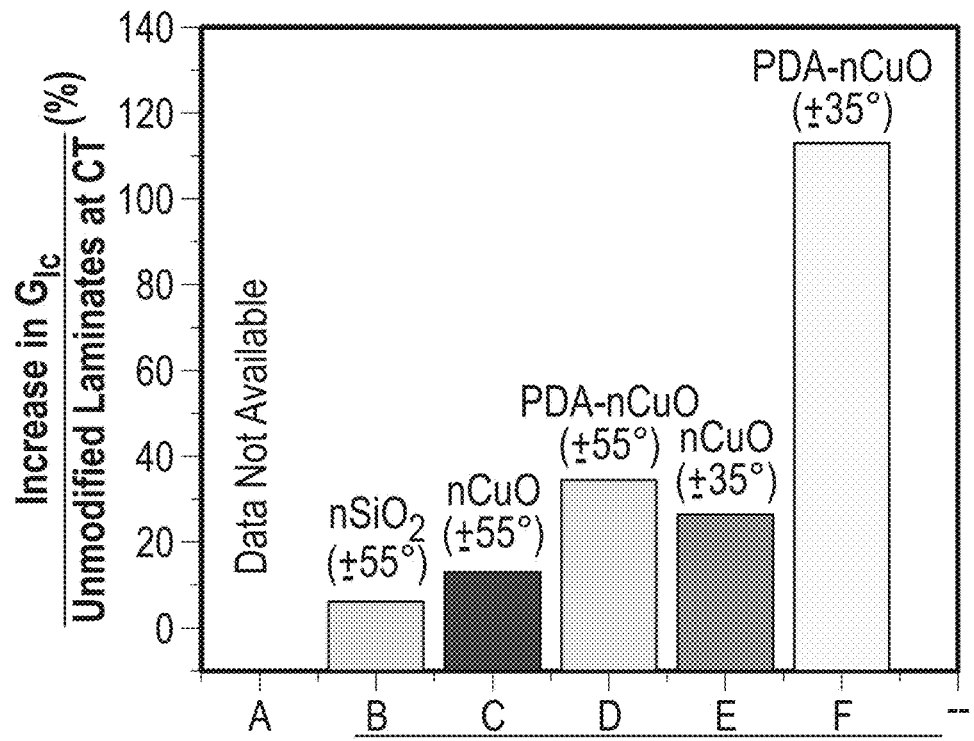
FIG. 14A illustrates percentage increase in $G_{Ic}$ values of modified laminated composites compared to unmodified laminated composites at cryogenic temperature: (A) 3.6 vol % FCNT (−150° C.), (B) 4.5 vol % $nSiO_2$, −196° C. and ±55° fiber angle, (C) 0.19 vol % nCuO, −196° C. and ±55° fiber angle (D) 0.19 vol % PDA-coated nCuO, −196° C. and ±55° fiber angle (E) 0.19 vol % nCuO, −196° C. and ±35° fiber angle and (F) 0.19 vol % PDA-coated nCuO, −196° C. and 35° fiber angle.
Figure 14B:
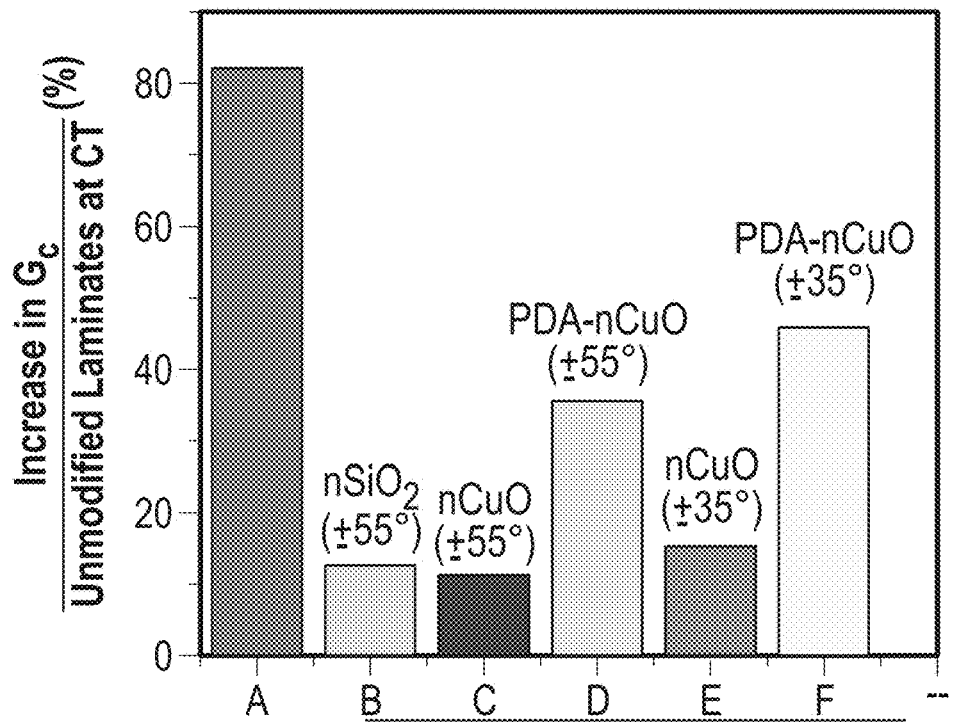
FIG. 14B illustrates percentage increase in Ge values of modified laminated composites compared to unmodified laminated composites at cryogenic temperature: (A) 3.6 vol % FCNT (−150° C.), (B) 4.5 vol % $nSiO_2$, −196° C. and 55° fiber angle, (C) 0.19 vol % nCuO, −196° C. and ±55° fiber angle (D) 0.19 vol % PDA-coated nCuO, −196° C. and ±55° fiber angle (E) 0.19 vol % nCuO, −196° C. and +350 fiber angle and (F) 0.19 vol % PDA-coated nCuO, −196° C. and ±35° fiber angle.

A comparison of the percentage increases in Gic and Gc values of modified composites at cryogenic temperature from some examples and those reported in the literature is presented in FIGS. 14A and 14B. It can be seen that PDA-coated nano-CuO particles outperform other methods reported in the literature with a significant 113% increase in Gic values and 47% increase in Gc values for the ±35° angle ply laminates at cryogenic liquid nitrogen temperature of −196° C. Although FCNT at 3.6 vol % gives a higher propagation energy, no results have been reported on crack initiation energy value.

The performance of two nano-sized particles, nanosilica (nano-SiO2) and cupric oxide nanoparticles (nano-CuO), in toughening an epoxy polymer and its carbon fiber reinforced composites at room and cryogenic temperatures have been investigated. Based on the results of thermal-mechanical, tension, single-end-notch bending of modified epoxy, and double cantilever beam tests of angle-ply laminates ($[±55]_8$ and $[±35]_8$) at RT and CT, the following conclusions can be drawn:

The volumetric coefficient of thermal expansion of nano-CuO particles, measured by XRD crystallography, is found to be a low value of $4.85×10-6K-1$ in the cryogenic temperature range of 20~120K but increases to $15.9×10-6K-1$ in the 120~300K temperature range.

PDA-coated nano-CuO nanoparticles are highly effective at improving the tensile properties of the epoxy, with PDA coating being even more effective and the percentage of improvement being higher at cryogenic temperature than at room temperature. Without PDA coating, nano-CuO particles negatively affect the mechanical properties of the epoxy.

The addition of nanomaterials, such as nanosilica, nano-CuO, and PDA-coated nano-CuO, yields higher percentage of improvement in the fracture toughness of epoxy nanocomposites at CT than at RT. These improvements can be attributed to the mechanisms of radial striation, crack pinning, void growth, and crack branching.

Comparing the present results with the best state-of-the art values, PDA-coated nano-CuO nanoparticles demonstrate the highest percentage of increase in the initiation and propagation fracture energy of carbon fiber laminates at cryogenic temperature. Composites with the epoxy matrix containing PDA-coated nano-CuO particles show the best increases in both initiation and propagation fracture energy values at the cryogenic temperature compared to that of unmodified composites.

The better performance offered by PDA coating of the nano-CuO particles is attributed to the improved interaction with the epoxy, which promote fiber fracture and matrix cohesive failure.

The modelling of the example showed that the Nielsen no-slippage model is in good agreement with the measured Young's modulus values and Pukanszky model is in good agreement with the measured tensile strength values. The fracture energy of the nanoparticle modified epoxies was predicted, by considering the contributions of the toughening mechanisms of nanoparticle debonding, void growth and shear yielding of the epoxy. This indicated that debonding, void growth and shear yielding contribute to the toughening effect, but the contribution of debonding is not significant. There was good agreement between the predictions and the experimental results for nano-SiO2, nano-CuO and PDA-coated nano-CuO-epoxy nanocomposites.

Various examples of aspects of the disclosure are described below as clauses for convenience. These are provided as examples, and do not limit the subject technology.

Clause A: a storage vessel comprising: a liner; and a shell extending about the liner, the shell comprising: multiple fibers; and a resin matrix comprising a resin and metal particles within the resin, each of the metal particles being coated with a polymer.

Clause B: a storage vessel comprising: a shell formed by multiple fibers wound about an axis and infused with a resin matrix, the resin matrix comprising metal particles coated with a polymer and distributed within a resin, wherein the shell forms an interior chamber of the storage vessel.

Clause C: a method, comprising: coating each of multiple metal particles with a polymer; mixing the polymer-coated metal particles with a resin to form a resin matrix; applying the resin matrix to fibers; and winding the fibers and the resin matrix about a liner to form a shell.

One or more of the above clauses can include one or more of the features described below. It is noted that any of the following clauses may be combined in any combination with each other, and placed into a respective independent clause, e.g., Clause A, B, or C.

Clause 1: the polymer comprises polydopamine.

Clause 2: the metal particles comprise cupric oxide or silica.

Clause 3: the fibers comprise carbon.

Clause 4: the resin comprises epoxy.

Clause 5: an opening at an end of the liner.

Clause 6: each of the metal particles of the resin matrix has a maximum dimension that is between 10 nm and 100 nm.

Clause 7: the polymer-coated metal particles of the resin matrix form between 1 wt % and 10 wt % of the resin matrix.

Clause 8: applying heat to the shell until the resin is cured.

Clause 9: dissolving the liner such that the shell defines an inner chamber of a storage vessel.

Clause 10: the polymer comprises polydopamine.

Clause 11: the metal particles comprise cupric oxide or silica.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A storage vessel comprising:
   a liner; and
   a shell extending about the liner, the shell comprising:
      multiple fibers; and
      a resin matrix comprising a resin and metal particles within the resin, the resin comprising epoxy, the metal particles comprising cupric oxide, each of the metal particles of the resin matrix having a maximum dimension that is between 10 nm and 100 nm. each of the metal particles being coated with a polymer comprising polydopamine,
      wherein the polydopamine forms a covalent bond and a hydrogen bond with the resin,
      wherein the polymer-coated metal particles of the resin matrix form between 1 wt % and 9 wt % of the resin matrix.

2. The storage vessel of claim 1, wherein the metal particles further comprise silica.

3. The storage vessel of claim 1, further comprising an opening at an end of the liner.

4. The storage vessel of claim 1, wherein
   the fibers comprise carbon.

5. The storage vessel of claim 4, wherein the resin matrix further comprises a curing agent.

6. A storage vessel comprising:
   a shell formed by multiple fibers wound about an axis and infused with a resin matrix, the resin matrix comprising metal particles coated with a polymer and distributed within a resin, the resin comprising epoxy, the metal particles comprising cupric oxide, each of the metal particles of the resin matrix having a maximum dimension that is between 10 nm and 100 nm, the polymer comprising polydopamine,
   wherein the polydopamine forms a covalent bond and a hydrogen bond with the resin,
   wherein the polymer-coated metal particles of the resin matrix form between 1 wt % and 9 wt % of the resin matrix,
   wherein the shell forms an interior chamber of the storage vessel.

7. The storage vessel of claim 6, wherein the metal particles further comprise silica.

8. The storage vessel of claim 6, wherein
   the fibers comprise carbon.

9. The storage vessel of claim 8, wherein the resin matrix further comprises a curing agent.

10. A method of producing a storage vessel, comprising:
    coating each of multiple metal particles with a polymer comprising polydopamine;
    mixing the polymer-coated metal particles with a resin to form a resin matrix, wherein the polydopamine forms a covalent bond and a hydrogen bond with the resin, wherein the resin comprises epoxy, wherein the metal particles comprise cupric oxide, wherein each of the metal particles of the resin matrix has a maximum dimension that is between 10 nm and 100 nm, wherein the polymer-coated metal particles of the resin matrix form between 1 w % and 9 wt % of the resin matrix;
    applying the resin matrix to fibers;
    winding the fibers and the resin matrix about a liner to form a shell extending about the liner, the shell comprising the fibers and the resin matrix; and heating and/or curing the shell.

11. The method of claim 10, further comprising dissolving the liner such that the shell defines an inner chamber of the storage vessel.

12. The method of claim 10, wherein the metal particles further comprise silica.

* * * * *